United States Patent
Ambichl et al.

(10) Patent No.: US 11,500,757 B2
(45) Date of Patent: *Nov. 15, 2022

(54) METHOD AND SYSTEM FOR AUTOMATIC REAL-TIME CAUSALITY ANALYSIS OF END USER IMPACTING SYSTEM ANOMALIES USING CAUSALITY RULES AND TOPOLOGICAL UNDERSTANDING OF THE SYSTEM TO EFFECTIVELY FILTER RELEVANT MONITORING DATA

(71) Applicant: Dynatrace LLC, Waltham, MA (US)

(72) Inventors: Ernst Ambichl, Altenberg (AT); Herwig Moser, Freistadt (AT); Otmar Ertl, Linz (AT)

(73) Assignee: Dynatrace LLC, Waltham, MA (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/198,369

(22) Filed: Mar. 11, 2021

(65) Prior Publication Data
US 2021/0200660 A1     Jul. 1, 2021

Related U.S. Application Data

(63) Continuation of application No. 16/519,428, filed on Jul. 23, 2019, now Pat. No. 10,977,154.

(Continued)

(51) Int. Cl.
*G06F 11/34* (2006.01)
*G06F 16/901* (2019.01)
*G06F 11/07* (2006.01)

(52) U.S. Cl.
CPC ........ *G06F 11/3495* (2013.01); *G06F 11/079* (2013.01); *G06F 11/3452* (2013.01); *G06F 16/9024* (2019.01)

(58) Field of Classification Search
CPC .............. G06F 11/3495; G06F 11/079; G06F 11/3452; G06F 16/9024; G06F 2201/87;
(Continued)

(56) References Cited

U.S. PATENT DOCUMENTS

| | | |
|---|---|---|
| 10,083,073 B2 | 9/2018 | Ambichl et al. |
| 2006/0041659 A1 | 2/2006 | Hasan et al. |

(Continued)

OTHER PUBLICATIONS

Extended European Search Report from counterpart application EP 191899004, dated Mar. 6, 2020.

*Primary Examiner* — Benjamin M Thieu
(74) *Attorney, Agent, or Firm* — Harness, Dickey & Pierce, P.L.C.

(57) ABSTRACT

A system and method is disclosed for the automated identification of causal relationships between a selected set of trigger events and observed abnormal conditions in a monitored computer system. On the detection of a trigger event, a focused, recursive search for recorded abnormalities in reported measurement data, topological changes or transaction load is started to identify operating conditions that explain the trigger event. The system also receives topology data from deployed agents which is used to create and maintain a topological model of the monitored system. The topological model is used to restrict the search for causal explanations of the trigger event to elements of that have a connection or interact with the element on which the trigger event occurred. This assures that only monitoring data of elements is considered that are potentially involved in the causal chain of events that led to the trigger event.

22 Claims, 18 Drawing Sheets

Related U.S. Application Data

(60) Provisional application No. 62/714,270, filed on Aug. 3, 2018.

(58) Field of Classification Search
CPC ............. G06F 11/3466; G06F 11/0709; G06F 11/3006; G06F 11/3048
See application file for complete search history.

(56) References Cited

U.S. PATENT DOCUMENTS

| | | | |
|---|---|---|---|
| 2009/0183029 A1 | 7/2009 | Bethke et al. | |
| 2011/0264956 A1* | 10/2011 | Ito | G06F 11/0748 714/E11.147 |
| 2012/0066376 A1* | 3/2012 | Nagura | H04L 63/1416 709/224 |
| 2012/0254406 A1* | 10/2012 | Nagai | G06F 11/0748 709/224 |
| 2014/0237297 A1* | 8/2014 | Nagura | G06F 11/079 714/39 |
| 2015/0378805 A1* | 12/2015 | Nakano | H04L 41/0645 714/37 |
| 2016/0105350 A1 | 4/2016 | Greifeneder et al. | |
| 2017/0075749 A1 | 3/2017 | Ambichl et al. | |
| 2018/0373580 A1 | 12/2018 | Ertl et al. | |
| 2019/0079821 A1 | 3/2019 | Jeong et al. | |
| 2019/0318288 A1 | 10/2019 | Noskov et al. | |

* cited by examiner

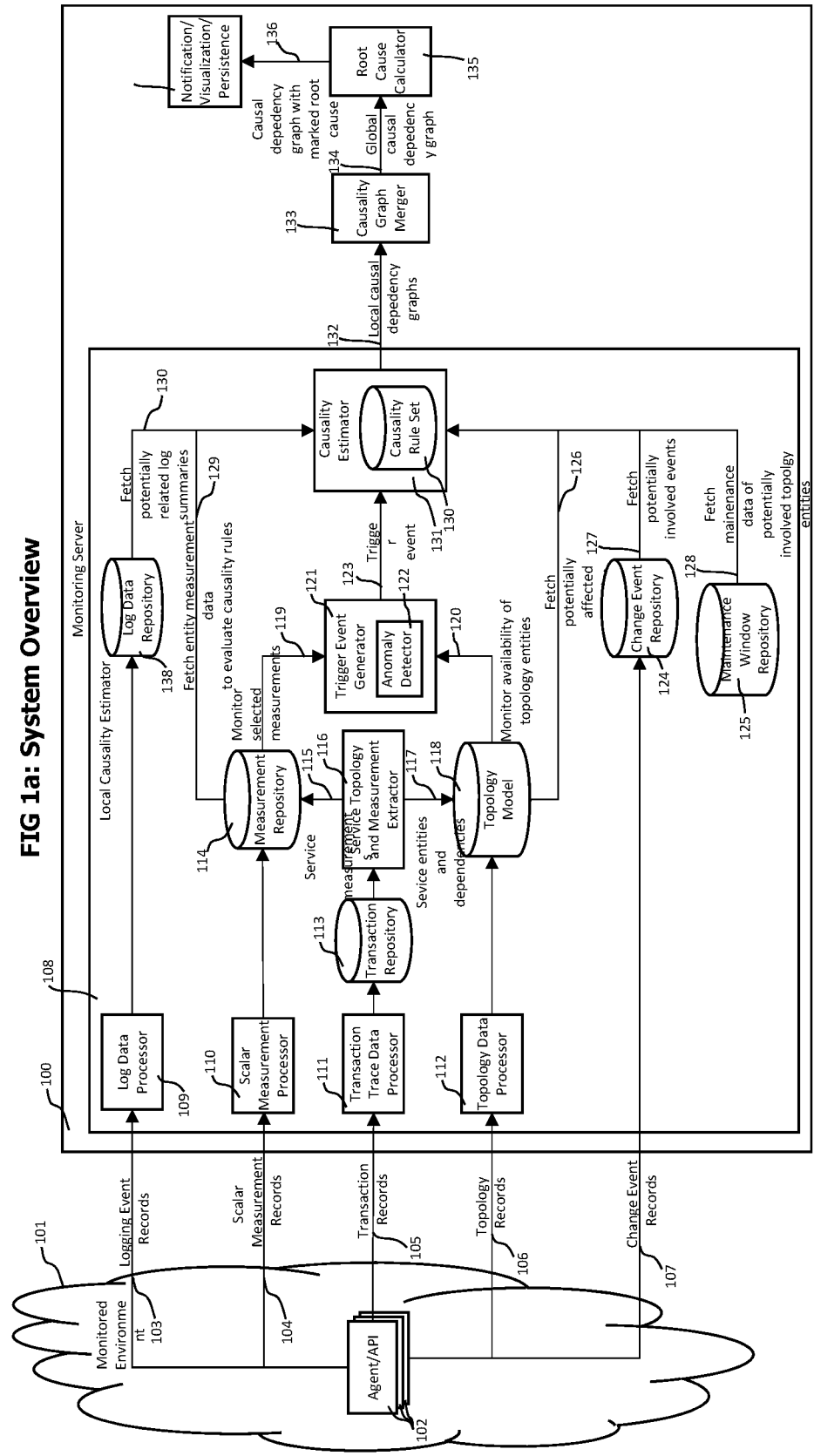
FIG 1a: System Overview

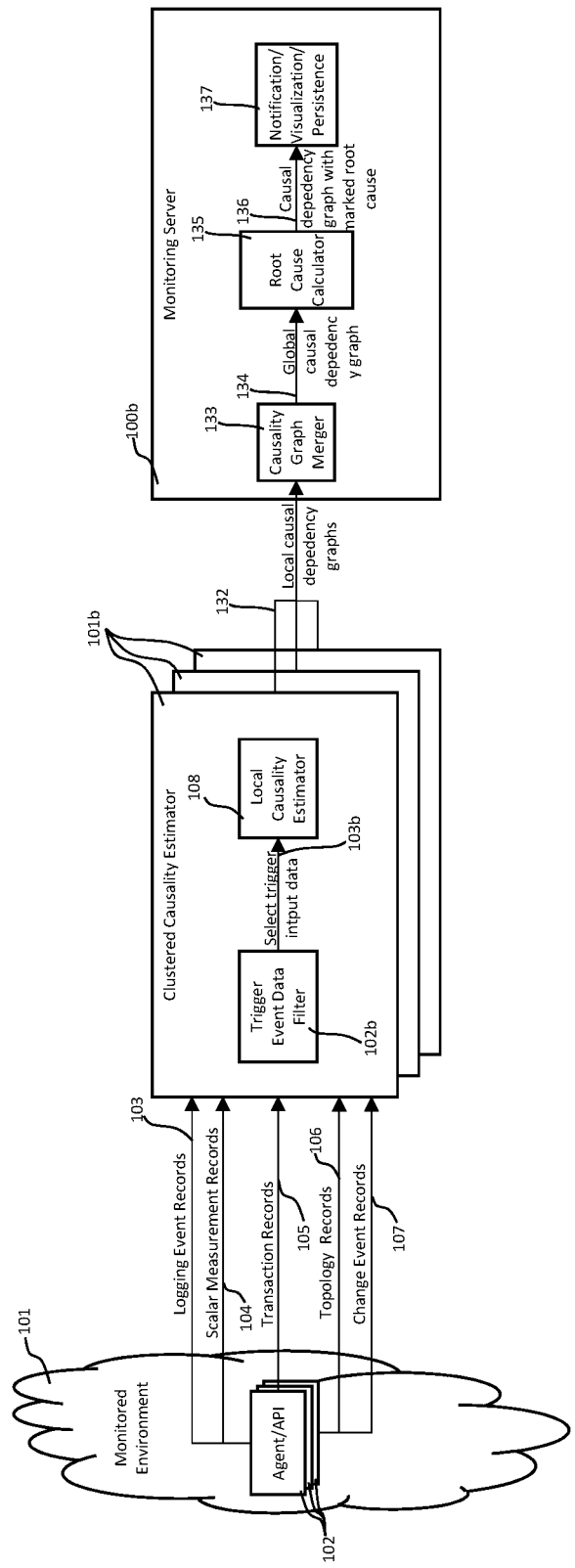
FIG 1b: System Overview Clustered Causality Estimation

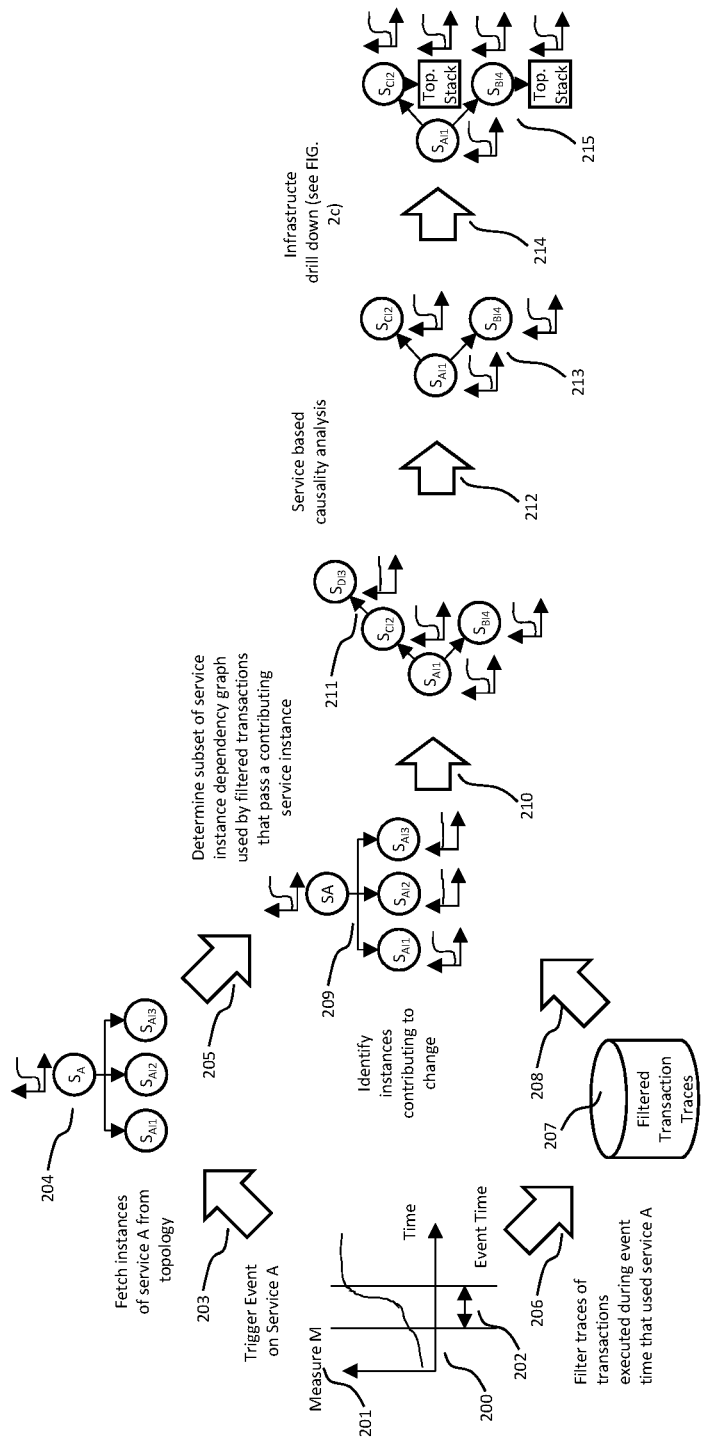
FIG 2a: Conceptual Causal Dependency Identification: Service/Transaction Level

FIG 2b: Conceptual Causal Dependency Identification: Service Level Causal Dependency Identification Strategies

FIG 2b1: Response Time Change Example

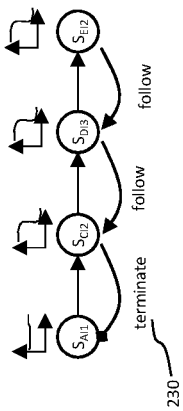

FIG 2b2: Response Time Change Causality Estimation Processing

Response time change event and filtered service instance call graph received → 211 → fetch called services, identify called services that show a response time change (212) → called services with change found? (214) → y → consider services with change in response time in causality estimation (213) → n → 215

FIG 2b3: Error Rate Change

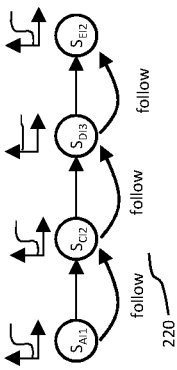

FIG 2b4: Error Rate Change Causality Estimation Processing

Error rate change event and filtered service instance call graph received → 221 → fetch called services (222) → called services found? (224) → y → consider services with change in error rate in causality estimation (223) → n → 225

FIG 2b5: Load Change

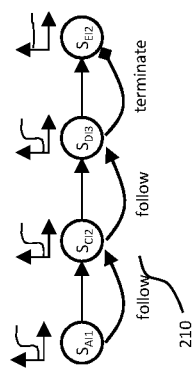

FIG 2b6: Load Change Causality Estimation Processing

Load change event and filtered service instance call graph received → 231 → fetch calling services, determine if calling service shows a load change (232) → calling services show load change? (234) → y → consider services with change in load in causality estimation (233) → n → 235

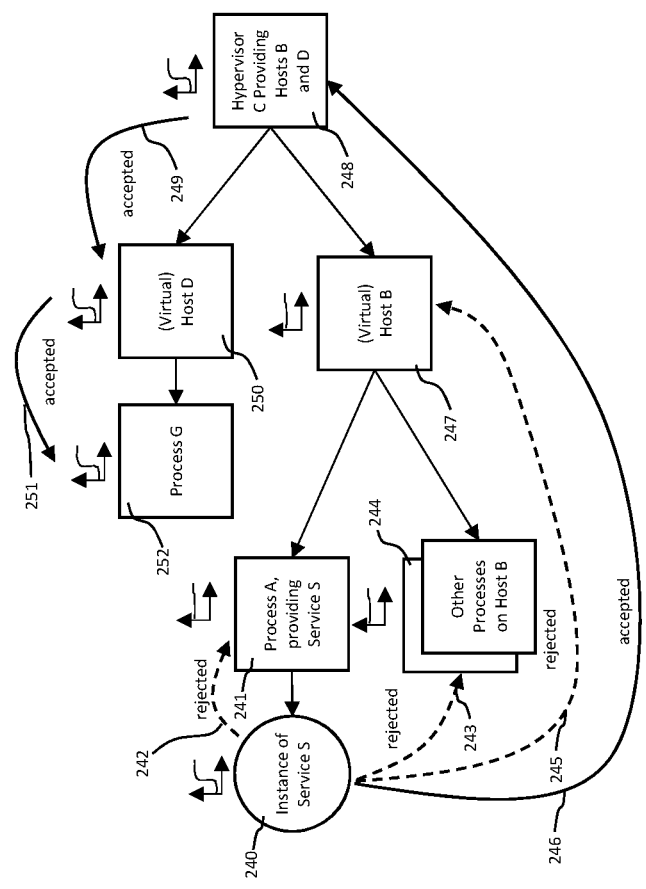
FIG 2c: Conceptual Causal Dependency Identification: Infrastructure Drill Down

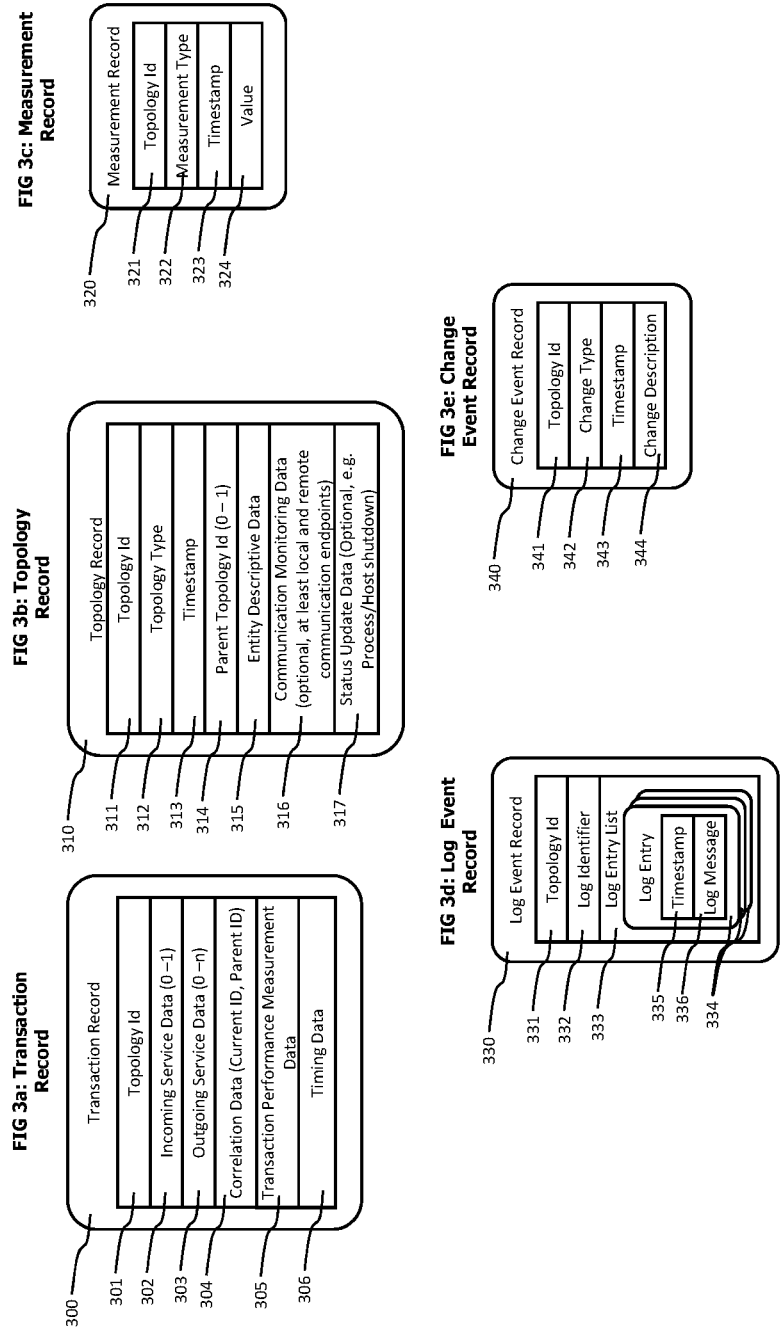

FIG 4: Processing of Agent Data
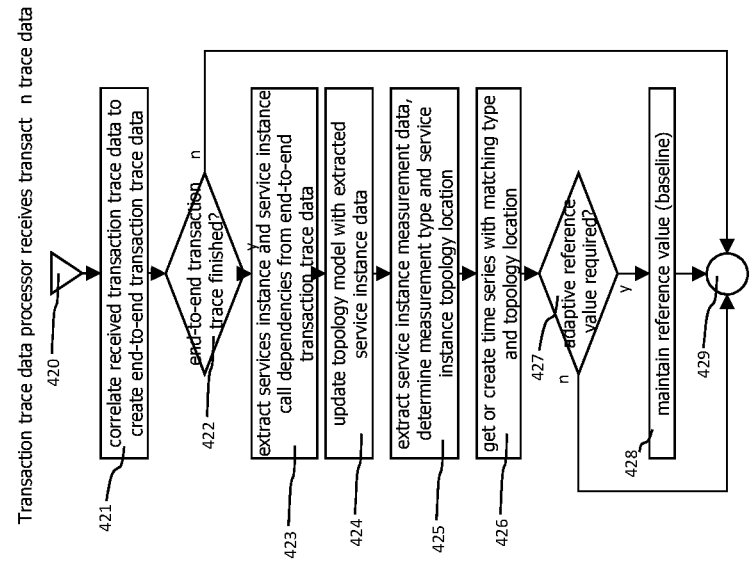
FIG 4c: Processing of Received Transaction Trace Records
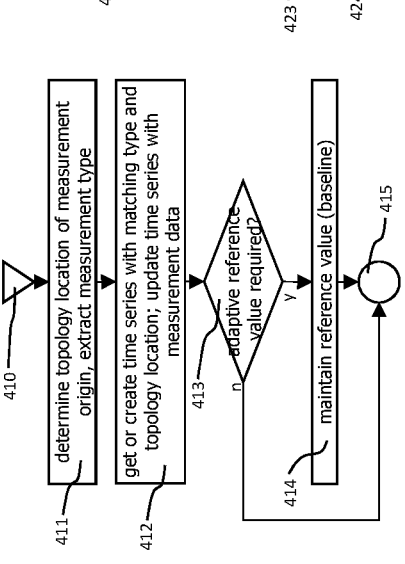
FIG 4b: Processing of Received Scalar Measurement Record
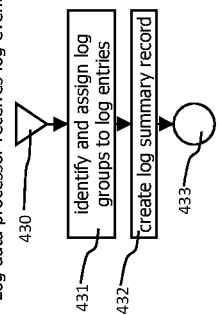
FIG 4d: Processing of Log Event Record
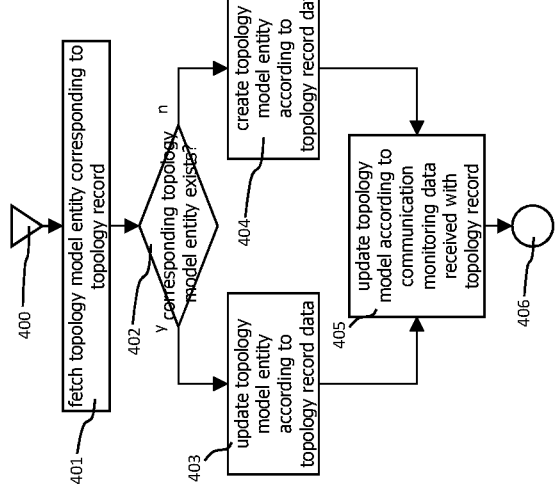
FIG 4a: Processing Received Topology Records

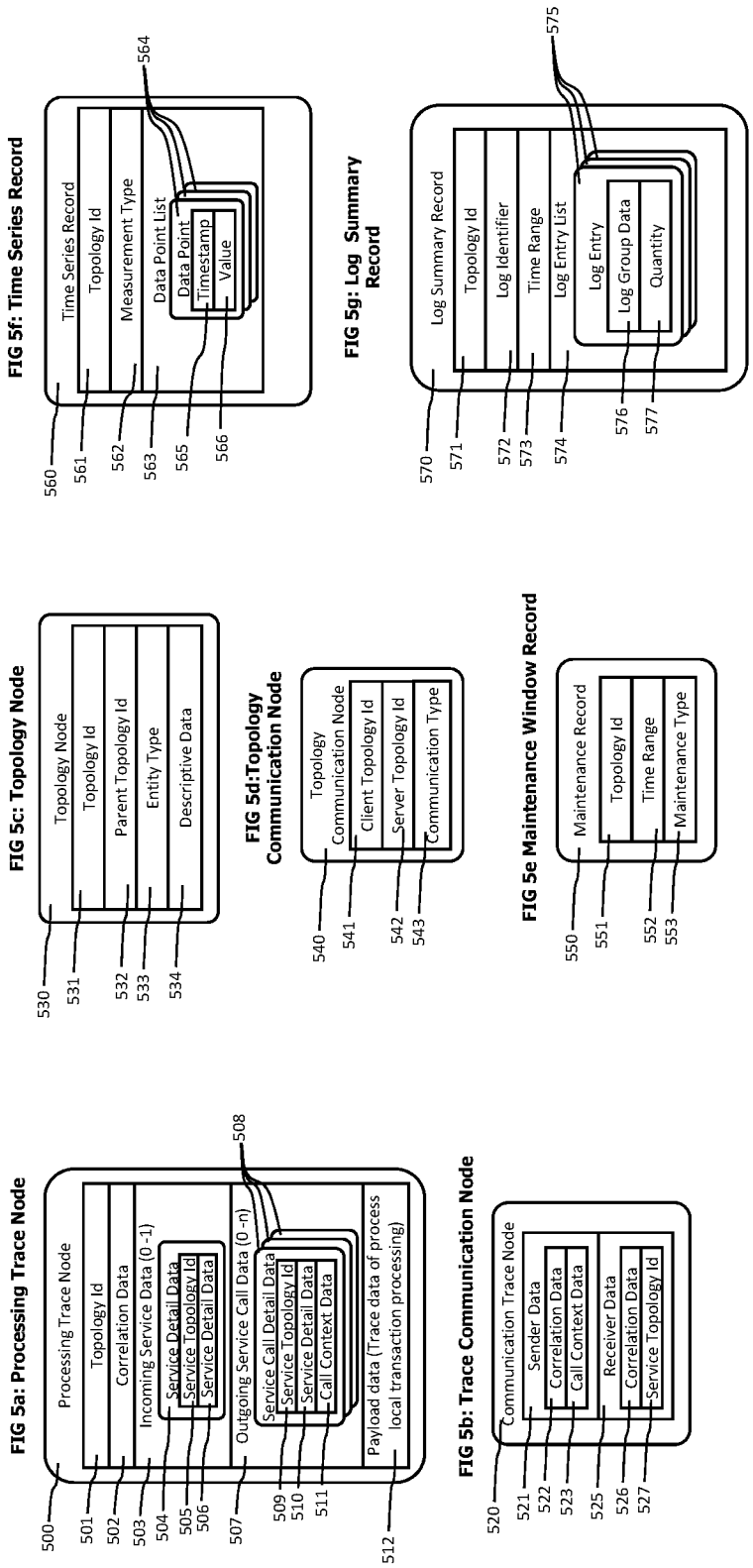

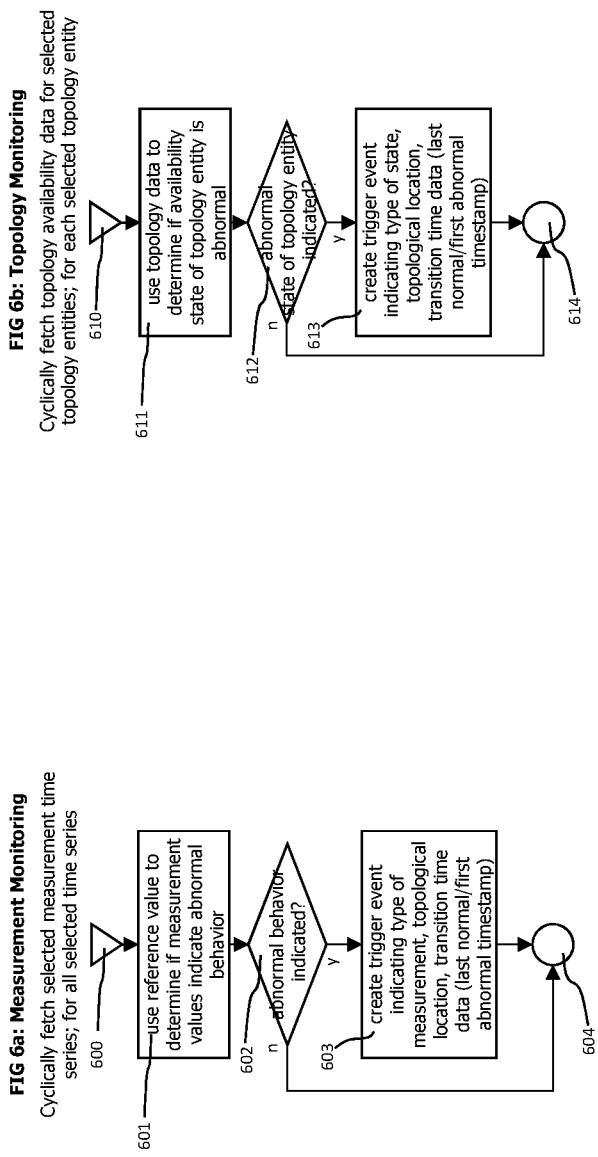

FIG 7: Causality Graph Records (Event Node Record, Causal Dependency Link, Causality Rule Record)

FIG 8: Causality Estimation
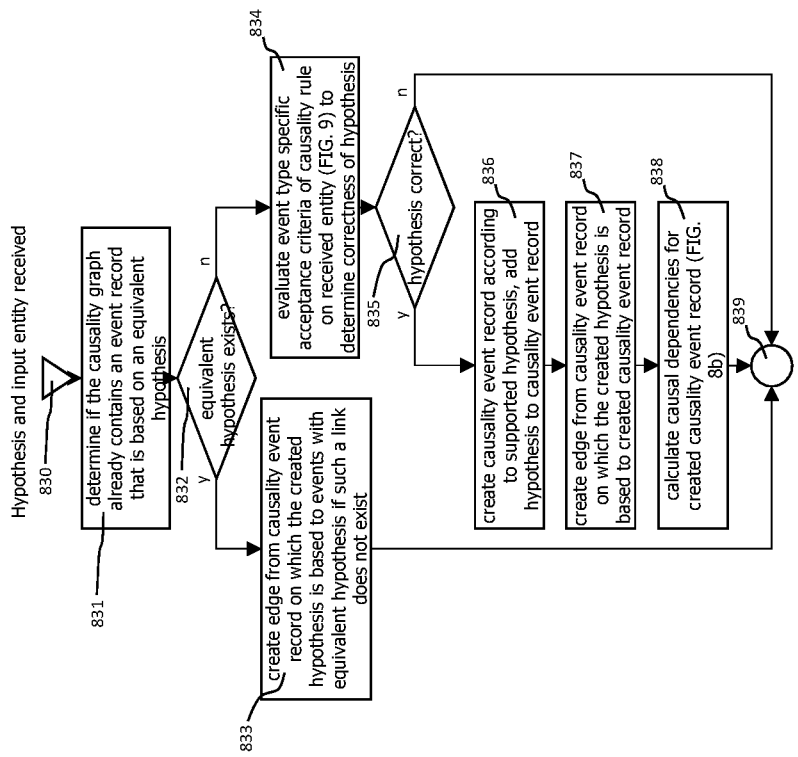
FIG 8d: Evaluate Hypothesis on Entity
Hypothesis and input entity received
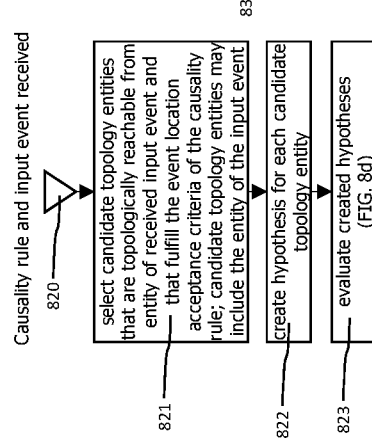
FIG 8c: Evaluate Causality Rule on Event
Causality rule and input event received
FIG 8a: Initiate Causality Estimation
Causality estimator receives trigger event
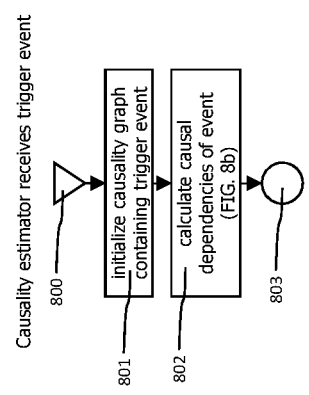
FIG 8b: Calculate Causal Dependencies of Event
Event for causal analysis received
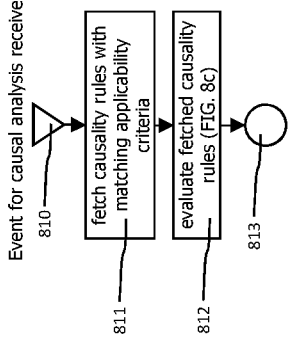

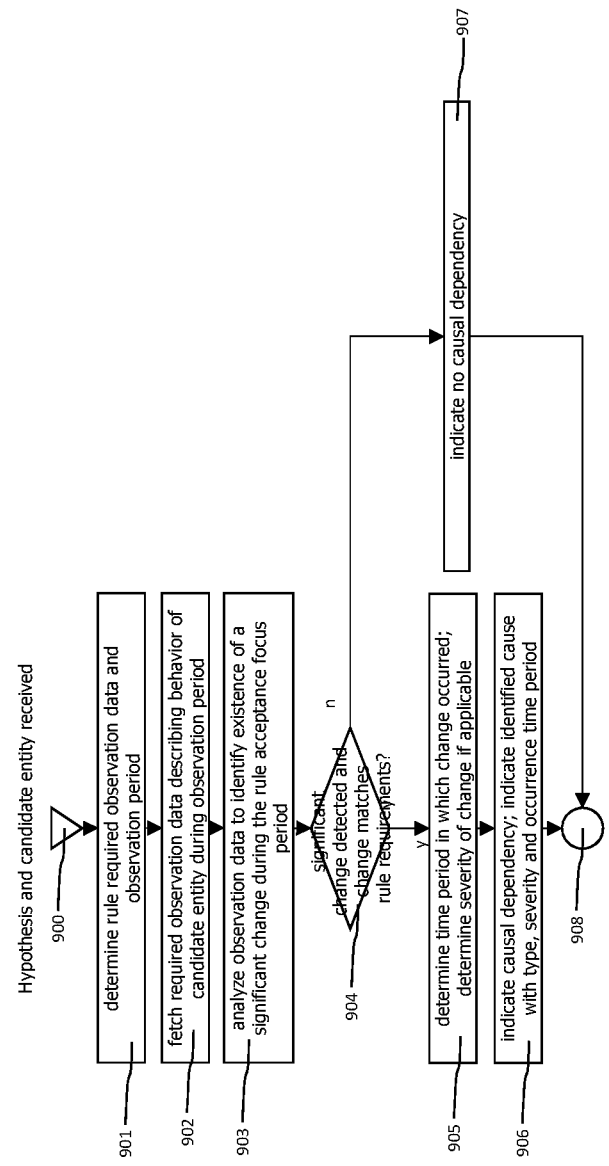
FIG 9: Exemplary Hypothesis Evaluation

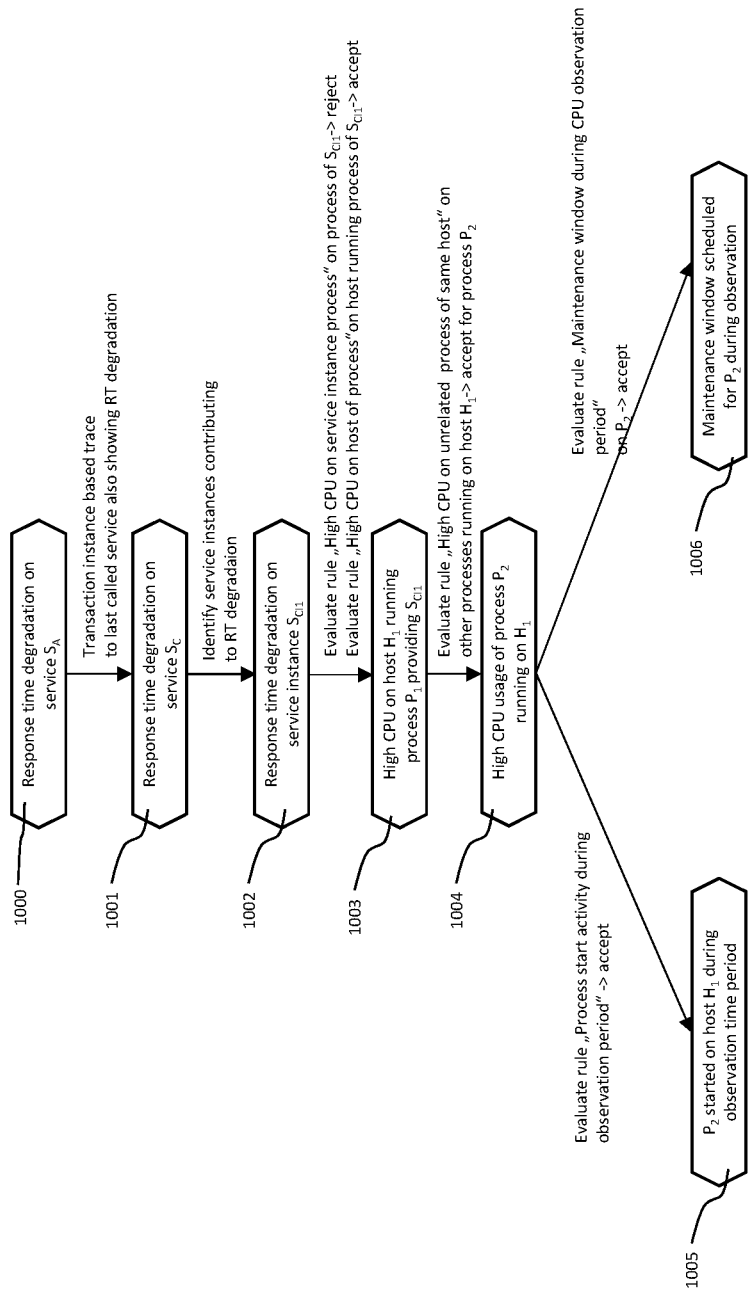

FIG 11: Causality Rule Evaluation

FIG 11a: Temporal Dependencies between Rule Observation Periods and Evidence Data Periods

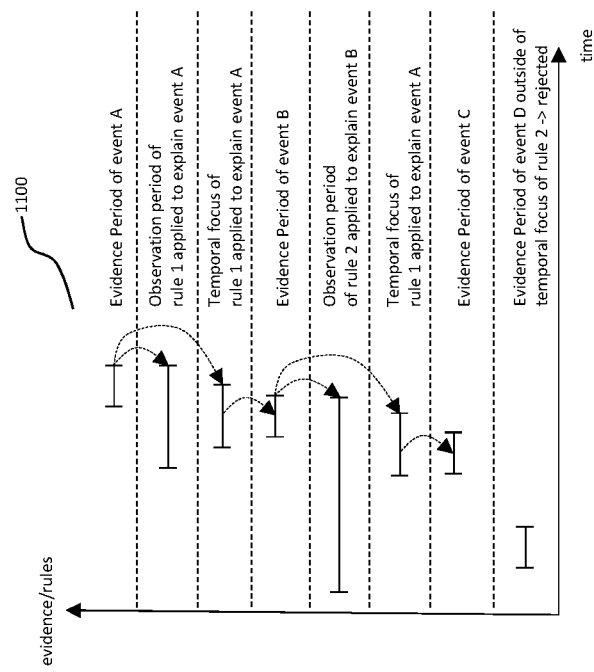

FIG 11b: Exemplary Causality Rules

| Applicability Criteria | Acceptance Criteria | Evidence Data | Evidence processing | Causal Weight |
|---|---|---|---|---|
| Service RT degradation | Service RT degradation on called service | Filtered transaction trace data using both services | Traces showing degradation on both services | Quantity of all filtered transactions vs. transactions showing degradation on called service |
| Service RT degradation | Service RT degradation on service instance | Filtered transaction trace data using service instance | Traces showing degradation on service instance | Quantity of all filtered transactions vs. transactions showing degradation on called service instance |
| Service instance RT degradation | High CPU on process of service instance | Process CPU metric | Change point | Temporal distance |
| Service instance RT degradation | High CPU on host of service instance | Host CPU metric | Change point | Temporal distance |
| High CPU on process | High CPU on host | Host CPU metric | Change point | Temporal distance |
| High CPU on host | High CPU on process | Process CPU metric | Change point | Temporal distance |
| High CPU on host | Process start | Process availability metric | Change point/topology change | Temporal distance |
| High CPU on process | Maintenance Window | Maintenance data | Maintenance duration data | Temporal distance/overlap |
| Any | Availability Change | Availability data | Compare availability states | Temporal distance |

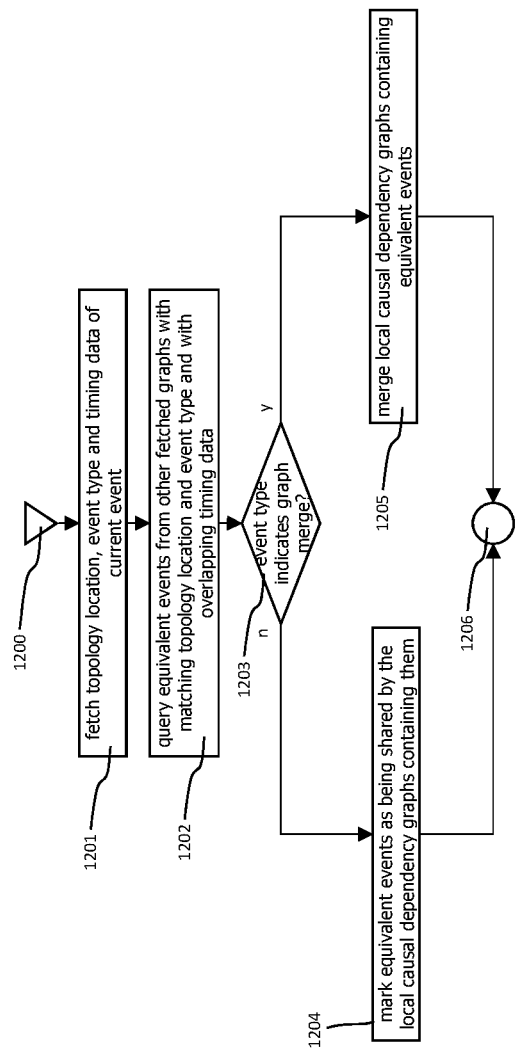

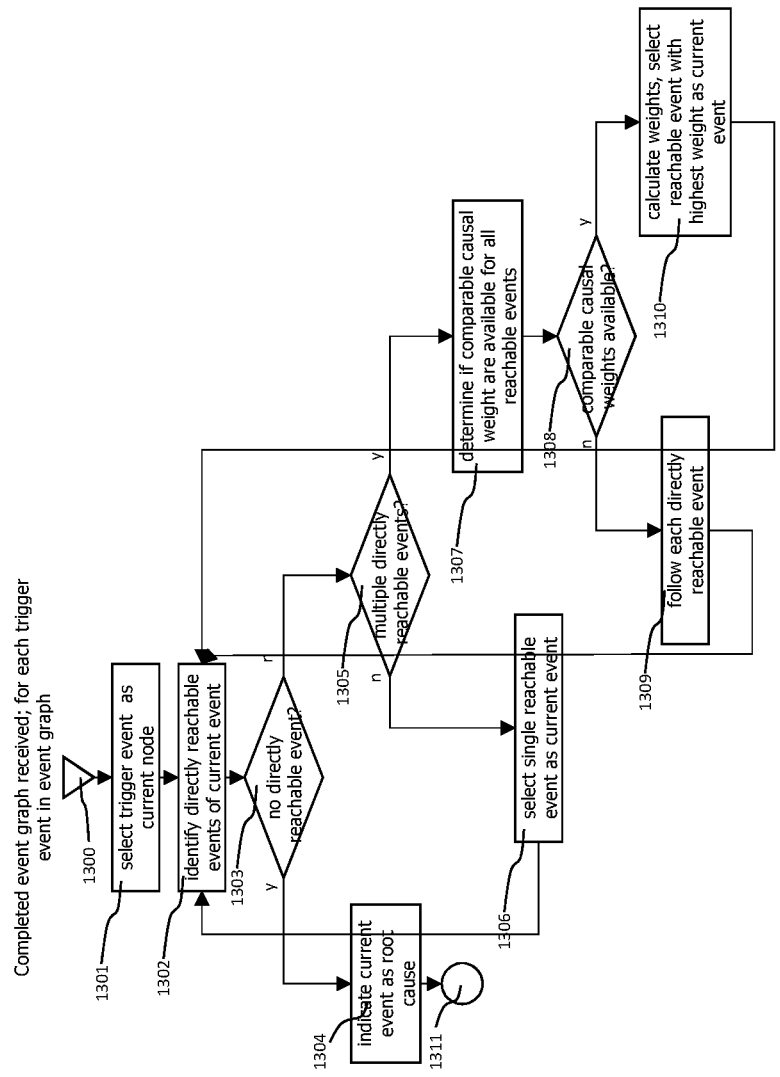
FIG 13: Root Cause Estimation

FIG 14: Detection of Change Points in Time Series
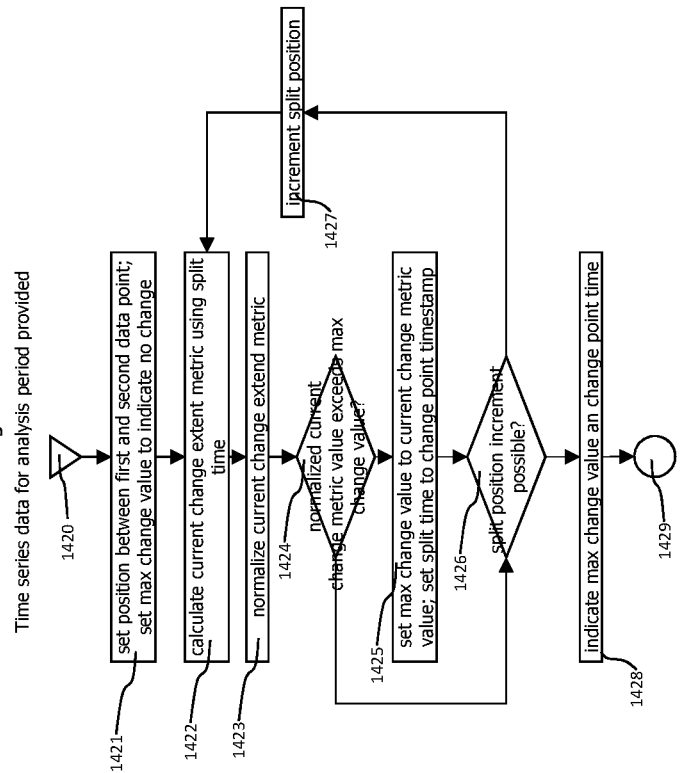
FIG 14b: Calculate Change Point Candidate
Time series data for analysis period provided
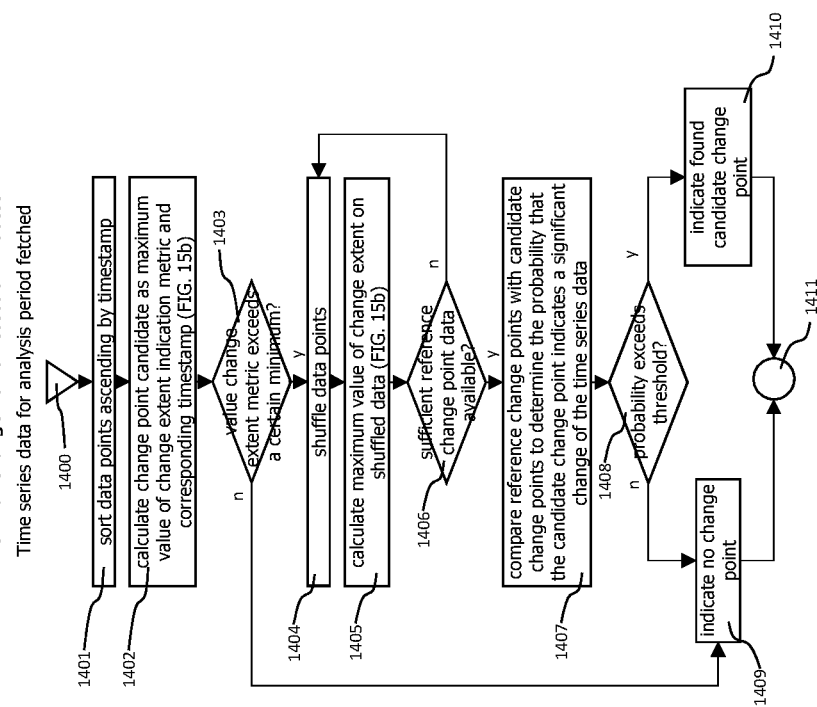
FIG 14a: Change Point Detection Process
Time series data for analysis period fetched

FIG 15: Detection of Change Points in Time Series Example
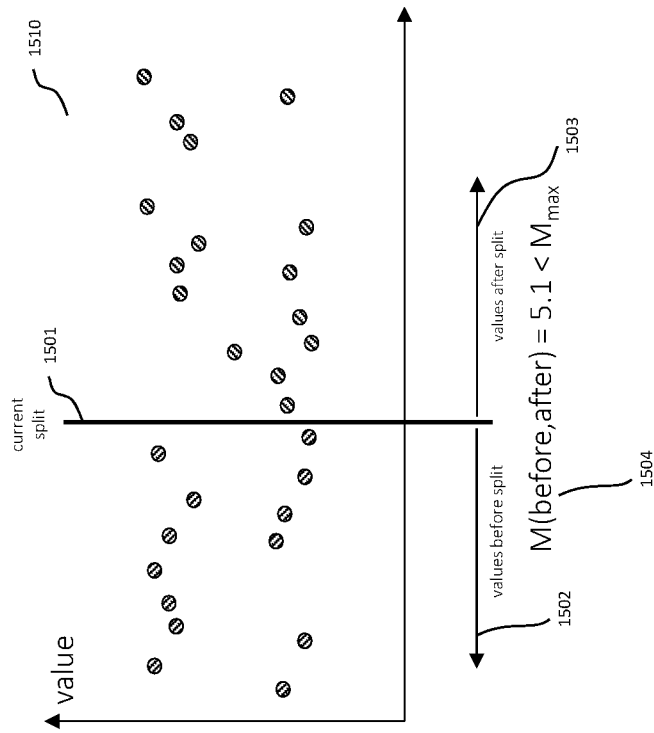
FIG 15a: Sorted Time Series
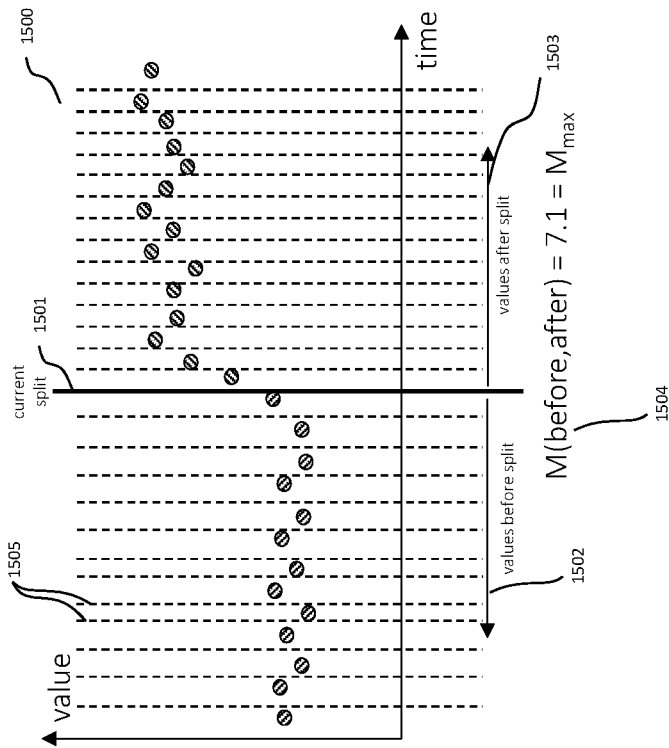
FIG 15b: Shuffled Time Series

METHOD AND SYSTEM FOR AUTOMATIC REAL-TIME CAUSALITY ANALYSIS OF END USER IMPACTING SYSTEM ANOMALIES USING CAUSALITY RULES AND TOPOLOGICAL UNDERSTANDING OF THE SYSTEM TO EFFECTIVELY FILTER RELEVANT MONITORING DATA

CROSS-REFERENCE TO RELATED APPLICATIONS

This application is a continuation of U.S. patent application Ser. No. 16/519,428, filed on Jul. 23, 2019, which claims the benefit of U.S. Provisional Application No. 62/714,270 filed on Aug. 3, 2018. The entire disclosures of the above applications are incorporated herein by reference.

FIELD OF THE INVENTION

The invention generally relates to the field of automated causality detection and more specifically to detection of causality relations and root cause candidates for performance and resource utilization related events reported by transaction tracing and infrastructure monitoring agents.

BACKGROUND

The importance of application performance monitoring has constantly increased over time, as even short and minor performance degradations or application outages can cause substantial losses of revenue for organizations operating those applications. Service-oriented application architectures that build complex applications by a network of loosely connected, interacting services provide great flexibility to application developers. In addition, virtualization technologies provide more flexibility, load adaptive assignment of hardware resources to applications. As those techniques increase flexibility and scalability of the applications which enables a more agile reaction of application developers and operators to changed requirements, this also increases the complexity of application architectures and application execution environments.

Monitoring systems exist that provide data describing application performance in form of e.g. transaction trace data or service response times or hardware resource utilization in form of e.g. CPU or memory usage of concrete or virtual hardware. Some of those monitoring systems also provide monitoring data describing the resource utilization of virtualization infrastructure like hypervisors that may be used to manage and execute multiple virtual computer systems. Although those monitoring systems provide valuable data allowing to identify undesired or abnormal operating conditions of individual software or hardware entities involved in the execution of an application, they lack the ability to determine the impact that the detected abnormal conditions may have on other components of the application or on the overall performance of the application. Components required to perform the functionality of an application typically depend on each other and an abnormal operating condition of one of those components most likely causes abnormal operating conditions in one or more of the component that directly or indirectly depend on it. Knowing those dependencies on which causal effects between abnormal operating conditions may travel can greatly improve the efficiency of countermeasures to repair those abnormal operating conditions. However, those dependencies are e.g. caused by communicating software services and components or by shared virtualization infrastructure. Documentation describing those dependencies is often not available, or manually analyzing this dependency documentation is too time-consuming for the fast decisions required to identify appropriate countermeasures.

U.S. patent application Ser. No. 15/264,867 "Method and System for Real-Time Causality and Root Cause Determination of Transaction and Infrastructure related Events provided by Multiple, Heterogeneous Agents" by Ambichl et al. which is incorporated herein by reference in its entirety, proposes a system that uses monitoring data from agents to create a topological system of a monitored system and to identify abnormal operating conditions related to elements of a monitored system and to transactions executed by the monitored system. The proposed monitoring system uses the topology data and a set of causality rules to estimate causal relationships between pairs of identified abnormal operating conditions to create directed graphs that describe the causal dependencies between multiple abnormal operation conditions. Finally, the system analyzes those causality graphs to determine abnormal operating conditions in the causality graphs that have a high probability to be the root cause of the other abnormal operating conditions in the graph.

Although the proposed system is capable to identify plausible causal relationships between different abnormal operating systems, it still has some weaknesses that need to be addressed.

As an example, all monitoring data needs to be permanently analyzed to determine the existence of abnormal operating conditions as input for the causality determination. This generates a significant CPU load on the analysis components of the monitoring system which has adverse effects on the scalability of the monitoring system.

Further, all identified abnormal operating conditions are processed equally and the system provides no means to focus on specific types of abnormal operating conditions, like e.g. abnormal operating conditions that directly affect the end-user of the monitored system and to e.g. neglect abnormal operating conditions that are only related to background tasks. This leads to a high rate of undesired notifications created by the monitoring system that decreased the overall value provided by the system.

Consequently, a system and method are desired in the art that overcomes above limitations.

This section provides background information related to the present disclosure which is not necessarily prior art.

SUMMARY

This section provides a general summary of the disclosure, and is not a comprehensive disclosure of its full scope or all of its features.

The disclosed technology is directed to a focused and directed identification of causal dependencies between identified and localized abnormal operating conditions on a monitored system comprising in software and hardware components. A heterogeneous set of monitoring agents is deployed to components of the monitored system that provide monitoring data describing the operating conditions of monitored components. In addition, the disclosed technology provides application programmable interfaces (APIs) complementary to deployed agents which may be used by components of the monitored system to provide additional monitoring data.

The monitoring data may contain topology-related data describing structural aspects of the monitored system, resource utilization data describing the usage of resources like CPU cycles, memory (main memory and secondary memory), transaction trace data describing the execution of transactions executed by the monitored system, log data describing the operating conditions of monitored components in textual form, change event data describing changes of the monitored environment, as e.g. the update of software or hardware components of the monitored environment, including the change of operating system kernel versions, change of software libraries, or in case the monitored environment is fully or partially executed in a cloud computing environment, data describing changes of the cloud computing environment.

The topology-related data may contain but is not limited to data describing virtualization infrastructure used by the monitored system, like virtualization management components and the virtualized host computing systems provided by those virtualization management components, host computing systems including virtualized and non-virtualized host computing systems, the processes executed on those host computing systems and the services provided by those hosts. In addition, the topology-related data may include data describing relations between components of the monitored environment, including vertical relations e.g. describing the processes executed by specific host computing systems or the virtualized host computing system provided by specific virtualization management components and horizontal relations describing e.g. monitored communication activities between components of the monitored environment. The monitoring system may integrate received topology-related data into a unified topology model of the monitored environment.

Other received monitoring data, like resource utilization data, transaction trace data, log data or change event data may contain topology localization data that identifies a location in the topology model (e.g. elements of the topology model that describe a process or a host computing system for resource utilization data, a process for log data, one or more services provided by one or more processes for transaction trace data, or various elements of the topology model affected by a change event) that corresponds to the monitoring data.

Received transaction trace data may be analyzed to extract measurement data describing performance and functionality of the monitored transaction executions. The temporal development of a selected set of those measurements may be monitored in detail (e.g. by using automated baseline value calculation mechanisms) to identify abnormal operating conditions of transactions, like increased transaction response times or failure rates. As transaction trace data also contains topology location data, a location in the topology model can be assigned to those identified abnormal operation conditions. Those abnormal operating conditions may be used as trigger events for a subsequent, detailed causality analysis directed to the identification of the root causes of those abnormal operating conditions.

In addition, a selected portion of the components of the monitored environment may also be monitored in detail, like processes providing services that are directly accessed by end-users of applications provided by the monitored environment and host computing systems running those processes. Detected, unexpected changes in the availability of those components, like an unexpected termination of a process, or unexpected unavailability of a host computing system may also be used as trigger events for a detailed causality analysis.

The detailed causality analysis triggered by such trigger events performs a focused, recursive, topology model driven search for other abnormal operation conditions for which the probability of a causal relationship with the trigger event exceeds a certain threshold. The causality search may start at topology element on which the trigger event was executed. Causality rules may be selected from a set of causality rules that correspond to the effect specified by the trigger event.

The selected causality rules may then be used to establish a set of hypotheses that describe potential conditions that may have caused the trigger event.

Topology elements that are either horizontally or vertically connected with the topology element on which the trigger event occurred, including the topology element on which the trigger event occurred are fetched, and the created hypotheses are evaluated using monitoring data of those topology elements. For hypotheses that are evaluated positive and that are accepted, another event is created, and hypothesis establishment and evaluation is continued for those events. This process continues until no more hypotheses can be established, no more topology elements are available to evaluate the established hypotheses, or all established hypotheses are rejected.

The trigger event and all evens identified by accepted hypotheses are used to form a local causality graph that describes identified causal dependencies of the trigger event.

Multiple local causality graphs may be analyzed to identify equivalent events that occur in multiple local causality graphs. Local causality graphs that share equivalent events may be merged. Afterwards, newly merged causality graphs may be compared with causality graphs that were already provided to users of the monitoring system to identify equivalent events with those causality graphs.

New causality graphs may then merge into already published causality graphs by assuring that no already notified causality graphs may disappear due to a merge but only grow due to new causality graphs merged into them.

Root cause calculation may afterward be performed on merged causality graphs to identify those events that are the most probably root cause of other events of the graph.

Variant embodiments of the disclosed technology may, to improve performance and capacity of the monitoring system, perform the calculation of local causality graphs in a decentralized, clustered and parallel environment and only perform merging and subsequent steps on a centralized server.

Other variants may use service call dependencies derived from monitored transaction executions together with measurement data describing performance and functionality of executions of those services to determine causal dependencies.

Yet other variants may use vertical topology relationships like relationships between services and processes providing those services or processes and host computer systems executing those processes to identify causal dependencies.

Other variants may use statistical analysis methods on time series data to determine a point in time at which a significant change of the time series measurements occurred.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 1a provides a block diagram of an agent-based monitoring system that includes causality estimation features.

FIG. 1b shows a block diagram of a monitoring system that performs portions of the causality estimation in parallel, in a clustered environment.

FIG. 2a visually describes the process of determining causal dependencies on a service call dependency level.

FIGS. 2b1-2b6 show exemplary causality determination strategies for different types of unexpected operating conditions.

FIG. 2c depicts the identification of causal dependencies using horizontal topological relations.

FIGS. 3a-3e show data records that may be used to transfer monitoring data acquired by agents or provided to monitoring APIs to an environment that processes the monitoring data.

FIGS. 4a-4d provide flow charts describing the processing of incoming monitoring data.

FIGS. 5a-5g show data records that may be used to store received and processed monitoring data on a monitoring server.

FIGS. 6a-6b show flow charts of processes that may be used to create trigger events that initiate a subsequent detailed causality analysis.

FIGS. 7a-7d show data records that may be used to create and store causality graphs that describe the causal relations between different identified unexpected operating conditions.

FIGS. 8a-8d provide flow charts of processes related to the determination of causal dependency graphs FIG. 9 shows a flow chart of an exemplary process to evaluate a hypothesis for a causal dependency.

FIG. 10 visually describes and exemplary causality graph.

FIGS. 11a-11b visually describe temporal aspects of causality rule and hypothesis evaluation and provides an exemplary set of causality rules.

FIG. 12 conceptually describes the process of merging local causality graphs.

FIG. 13 shows an exemplary process to identify root cause elements of a causality graph.

FIGS. 14a-14b provide flow charts of processes that identify the time when a statistically relevant change of time series data occurred.

FIGS. 15a-15b visually describe the identification of a change point in a time series.

Corresponding reference numerals indicate corresponding parts throughout the several views of the drawings.

DETAILED DESCRIPTION OF EXEMPLARY EMBODIMENTS

Example embodiments will now be described more fully with reference to the accompanying drawings.

The present technology provides a comprehensive approach to integrate various types of monitoring data describing static and dynamic aspects of a distributed computer system into a model that allows the focused and directed identification of relevant abnormal operating conditions and the search for other, corresponding abnormal operating conditions that are causally related with the relevant abnormal operating conditions.

Portions of the monitoring data are used to create a living, multi-dimensional topology model of the monitored environment that describes communication and structure based relations of the monitored environment. Other portions of the monitoring data describing transaction executions performed on the monitored environment may be used to monitor performance and functionality of services provided by the monitored environment and used by the executed transaction. This monitoring data may be continuously analyzed to identify abnormal operating conditions. Still another portion of the monitoring data may be used to describe resource utilization, availability and communication activities of elements of the monitored environment.

Identified transaction execution related anomalies are located on a topology element, and the connection data of the topology model may be used to identify topology entities that are related to the location. Monitoring data corresponding to those identified topology entities may then be used in a detailed and focused analysis to identify other unexpected operation conditions that are in a causal relationship with the first identified transaction related abnormal operating condition.

Referring now to FIG. 1 which provides an overview of a monitoring system and a monitored environment according to the disclosed technologies in form of a block diagram.

A monitoring server 100 interacts with a heterogeneous set of agents and APIs 102 deployed to a monitored environment 101. The agents may instrument elements of the monitored environments, like processes, host computing systems, network components or virtualization component and use this instrumentation to receive monitoring data describing structure, activities and resource usage of the monitored environment. APIs may provide interfaces for operators of the monitored environment to provide additional data about the monitored environment, like data describing changes in an underlying cloud computing system, or the update of hardware or software components of the monitored environment.

The provided monitoring data may contain but is not limited to log event records 103 containing data describing logging activities of components of the monitored environment, scalar measurement records 104 containing measurement data describing components of the monitored environment, like resource usage measures, transaction records 105 containing data describing transactions executed by components of the monitored environment, topology records 106, describing elements of the monitored environments and their vertical (e.g. processes executed by host computing system) and horizontal (e.g. communication activities between monitored processes) relationships, and change event records 107 describing changes that occurred in the monitored environment, like the update of hardware or software components.

The monitoring data may be gathered by the agents and APIs and sent to the monitoring server via a connecting computer network (not shown).

Various components of the monitoring server may receive and process monitoring data according to its type. Log event records 103 may be received by a log data processor 109, which analyzes received log event records and stores the analysis result in a log data repository 138.

Scalar measurement records 104 are received by a scalar measurement processor 110 and analyzed to create measurement time series. The time series data may be stored in a measurement repository 114.

Transaction records 105 may be received by a transaction trace data processor 111, which analyzes and correlates received transaction trace records to create end-to-end transaction trace data which is stored in a transaction repository 113.

Topology records 106 are received by a topology data processor 112 and integrated into a topology model 118 of the monitored environment. Topology records describe components of the monitored environment and contain identifying data for each of those components. This identifying data may also be used to identify corresponding topology entities. All other monitoring data, like log event records 103, scalar measurement records 104, transaction records 105 and change event records 107 also contain such identifying data that identifies for each of those records one or more corresponding topology entities.

Received change event records 107 are stored in a change event repository 124.

In addition to monitoring data fetched from the monitored environment, a user of the monitoring system may, in addition, provide data about planned maintenance activities and affected elements of the monitored environments to the monitoring system. This maintenance data may be entered by the user via a graphical user interface or by using an automated data exchange interface and may be stored in a maintenance window repository 125.

End-to-end transaction trace data stored in the transaction repository 113 may be analyzed by a service topology and measurement extractor 116 to identify services used by executed transactions, to determine call dependencies of those services and to extract measurement data describing the service executions performed by those transactions.

The term service as used herein describes, in the broadest sense, an interface of a process which may be used to receive a request from another process or to send a request to another process. Service extraction identifies the interfaces or services used by a monitored transaction and creates a corresponding service entity in the topology model 118. As the transaction data contains data identifying the process that executed the transaction, the service extractor 116 may also assign identified services to process entities providing those services in the topology model, which locates the identified services in the topology model. In addition, the service extractor may extract service call dependencies from transaction trace data which describes e.g. service call nesting relationships. As an example, a transaction may call a service "A", which internally calls service "B". The service extractor 116 may identify such nested service calls and create a directed connection from service "A" to service "B" in the topology model that indicates this.

The service extractor 116 may also extract measurement data corresponding to identified services from transaction trace data and create service measurement data 115 which may be stored in the measurement repository in form of time series. Service measurement data 115 also contains topology identification data that identifies the service topology entity related to the service measurement data.

A trigger event generator 121 may cyclically fetch selected measurement time series (e.g. time series describing services used by transactions that provide value for end-users of the application) and use an anomaly detector 122 to determine whether those measures indicate abnormal operating conditions. The anomaly detector may use techniques like static thresholds or adaptive baselines to determine the existence of abnormal operating conditions. Variants of the anomaly detector 122 may instead or in addition use statistical change point detection technologies as disclosed later herein.

In addition, the trigger event generator may monitor the availability of selected topology entities, like host computer systems or processes that are used by a high number of transactions and are therefore of high importance for the functionality of the services provided by the monitored environment.

On identification of an abnormal operating condition indicated by monitored measurements or on the occurrence of an unexpected availability change indicated by the topology model, the trigger event generator creates 123 a trigger event which is forwarded to a causality estimator 131 for a detailed and focused causality analysis. Trigger events may contain data specifying the type and the extend of an abnormal operation condition, the location of the abnormal operation condition and data describing the temporal extend of the abnormal operation condition. Causality graph event nodes 720 as described in FIG. 7 may be used to represent trigger events.

The causality estimator 131 evaluates available monitoring data, like log data, measurement data, transaction trace data, change event and maintenance data using a set of causality rules 130, to identify other events indicating other abnormal operating conditions that have a direct or indirect causal relationship to the trigger event. The analysis performed by causality estimator also uses the topology model 118 and the topology coordinates of available monitoring data to identify topological entities that are connected (either via communication activities, like processes communicating using a computer network or via shared resources, like processes running on the same computer system and sharing resources like CPU cycles or memory) to topology entities corresponding to identified abnormal operating conditions. The search for other abnormal operating conditions that have a causal relationship with already identified abnormal operating conditions may be restricted to those connected topology entities and their corresponding monitoring data.

The analysis performed by the causality estimator creates local causal dependency graphs which are forwarded 132 to a causality graph merger 133. Local causal dependency graphs may be represented by a set of causality event nodes 720 connected by causality graph edges 730.

The processing modules to receive incoming monitoring data up to the causality estimator 130 may be grouped into a local causality estimator module 108.

Each local causal dependency graph represents the identified causal relationships that originated from an individual trigger event. Multiple trigger events may happen simultaneously or nearly simultaneously and may share one or more causing abnormal operating conditions. Users of a monitoring system are typically interested in the global causal dependencies that identify all causes and effects of abnormal operating conditions for a fast and efficient identification of problem root causes and an efficient execution of counter measures.

Therefor it is desired to identify such shared causes and merge local causal dependency graphs into global causal dependency graphs that convert the isolated causal dependencies derived from individual trigger events into graphs that show a more global view of the causal dependencies.

The causality graph merger 133 may perform this merge, by cyclically analyzing new received local event graphs to identify and merge those local event graphs that share identical events. Those identical events may describe abnormal operating conditions of the same type, that happened on the same topology entity and that happened (nearly) at the same time. In case different local event graphs contain identical events, those identical events may be merged into one event, which subsequently also merges the different local event graphs into one global event graph. The different incoming local event graphs cease to exist and form a new event graph.

After this initial merging step, the causality graph merger 133 may try to merge the newly merged graphs in already existing graphs that are already presented to a user of the monitoring system. Also in this step, identical events are identified, but now the new event graphs identified in the first step are merged into already existing and published event graphs. Therefore, already published event graphs do not disappear because they are merged with another graph. Already published event graphs may only grow because other graphs are merged into them.

The identified or updated global causality graphs are forwarded 134 to a root cause calculator 135, which identifies those events that have the highest probability of being the root cause of the other events contained in the global causality graph.

After root cause events were identified by the root cause calculator 135, the global event graphs may be forwarded for further processing, like sending notifications to users of the monitoring system, problem and causal dependency visualization or persistent storage 137.

A variant embodiment of the disclosed technology that uses a clustering approach to improve the throughput and capacity of the monitoring system is shown in FIG. 1*b*.

In this variant, the monitoring server 100*b* only consists in a causality graph merger 133, a root cause calculator and a notification/visualization/persistence module 137 that operate as described before. The processing steps performed before the graph merging step may be performed in multiple, parallel and simultaneously operating clustered causality estimators 101*b*. Each clustered causality estimators may reside on its own computer system that is different from the computer system executing the monitoring server 100*b*.

Monitoring data created by agents/APIs 102 deployed to the monitored environment 101 may be available to all clustered causality estimators 101*b*. The clustered causality estimators may contain a trigger event data filter 102*b*. The trigger event data filters 102*b* perform sharding of monitoring data that potentially creates trigger events, in a way that each local causality estimator 108 of a clustered causality estimator 101*b* receives a share of selected trigger input data 103*b* and that each share of the trigger input data is processed by exactly one local causality estimator 108 residing in a clustered causality estimator. Local causal dependency graphs created by local causality estimators 108 may be sent 132 from clustered causality estimators 101*b* to the monitoring server 100*b* via a connecting computer network (not shown). To increase the processing capacity of the monitoring system, to e.g. enable the connection of more agents/APIs 102 it is sufficient to add additional clustered causality estimator nodes 101*b* and reconfigure the trigger event data filters in a way that also the additional clustered causality estimator nodes 101*b* process their share of trigger input data.

Coming now to FIG. 2*a* which graphically describes the identification of causal dependencies on a transaction/service execution level. The end-to-end transaction trace records created by the transaction trace date processor 111 out of received transaction records 105 describe individual end-to-end transactions, including topology data identifying the processes involved in the transaction execution and data describing the communication interfaces of those processes that were used to transfer requests and responses between the processes involved in the transaction execution. The service topology and measurement extractor 116 analyzes end-to-end transaction records to extract the communication interfaces used by those transactions and service topology entities describing those communication interfaces. As the transaction trace data also contains topology data identifying the processes that performed the transaction execution, the identified service entities may be connected to corresponding process entities in the topology model that provide those services. The service topology and measurement extractor 116 may, in addition, identify call dependencies between identified services, like e.g. nested service calls in which a transaction execution calls a specific service on a specific process and the processing of this service call causes the execution of another service on another process. Such service call dependencies may also be stored in the topology model 118, e.g. in form of directed connections between service entities.

The service topology and measurement extractor 116 may further identify groups of equivalent services and create service group entities representing those groups of equivalent services.

Examples of such groups of equivalent services are services that are provided by clusters of equivalent processes. A cluster of equivalent processes is typically formed by a set of processes that execute the same code and use the same or similar configuration. Such process clusters are typically created to improve the processing capacity of a computing system by distributing the load among a set of equivalent processes. It is important for the understanding of the functionality of a computer system and for the understanding of the functional dependencies of the components of such a computing system to identify such process clusters. Requests directed to such clustered processes are typically dispatched via a load balancer that receives the requests and the load balancer selects a member of the cluster to process the request. In the topology model, such groups of equivalent services may be represented by service entities and the individual instances of the services in those groups may be represented as service instances. Those service instances may in the topology model be horizontally connected to the service they belong to and to the specific process instances providing the service instances.

The identification of causal dependencies on a transaction execution/service level typically starts with the identification of an event that indicates an abnormal operating condition. In FIG. 2*a*, this is an unexpected increase in the time series 200 of measure M 201 that occurred at a specific event time 202. Measure M 201 may correspond to a service A that is monitored by the trigger event generator 121.

On detection of an abnormal operating condition indicated by measure M (i.e. the values reported by measure M show an unexpected increase), the topology model is queried for the service instances corresponding to service A. In FIG. 2*a*, service A has the three service instances AI1, AI2, and AI3.

In addition, transaction trace data of transactions may be fetched from the transaction repository 113 that used service A (i.e. used one of the service instances of service A) during the event time 202 which describes the timing of the occurrence of the observed abnormal operating condition on service A (i.e. during the time period in which the values provided by measure M changed from normal to abnormal).

The fetched transaction traces are used to calculate the time series of M for the service instances of service A. Each of the fetched transactions used one of the service instances AI1, AI2 or AI3 for execution. Transactions that used AI1 are grouped, measurement values for measure M are extracted from this group of transactions and a time series for measure M that only considers transactions that used AI1 is created. The same is performed for the other service instances AI2 and AI3. The service instance specific time series for AI1, AI2, and AI3 show (see 209) that only service AI1 shows an abnormal behavior. The other service instance specific time series are unsuspicious. Service instance AI1 is identified as contributing to the abnormal behavior identified on service A.

It is noteworthy that different scenarios of contributing service instances may indicate different types of root causes. A scenario with only one service instance out of multiple service instances of a service is identified as contributing may indicate an isolated issue with the local processing environment, e.g. process or operating system, related to that service instance. A scenario in which most or all service instances of a service are identified as contributing may indicate a global problem, e.g. related to some entity or functionality that all those contributing service instances have in common, like the code they are executing or the configuration data they are using. The monitoring system may identify such scenarios and use the identified scenario for further causality processing, or directly report the identified scenario to the user of the monitoring system.

Afterwards, the transaction traces that used service instance AI1 during the event time 202 are further analyzed to identify a service instance dependency graph 211 of the services called by those filtered transaction traces to execute the service A. In the example shown in FIG. 2a, those transactions call service instance CI2 of a service C and service instance BI4 of service B. From service instance CI2, those transactions further call service instance DI3 of a service D.

After the service instance dependency graph of those transactions is identified, a service base causality analysis is performed, considering the direction in which causal effects are propagated.

As an example, the response time of a service instance is the sum of the time required for local calculations and of other service instances called by the service. A degraded response time of a service impacts the response time of the services that called this service. Therefore, for response time effects, a causal dependency from a cause to an effect travels against the direction of the service instance dependency graph.

The service load (the number of service instance executions per time unit) as another example, travels with the direction of the service instance dependency graph as a load change on a service instance is propagated to the services that are called by the service and therefore also causes a load change at the called services. Different types of service related abnormal conditions and corresponding strategies to identify causal dependencies are described in FIG. 2b.

The example described in FIG. 2a describes a response time related anomaly, therefore causes for the identified anomaly are searched down the service instance dependency graph, i.e. from a specific service instance to the service instances called by the specific service instance.

Conceptually, the service based causality analysis used the previously identified transaction traces to calculate measure time series for the service instances contained in the also previously identified service instance dependency graph 211. Those time series are then analyzed to identify abnormal conditions that coincide with the event time 202. In the example described in FIG. 2a, service instances CI2 and BI4 show an abnormal behavior, whereas service instance DI3 is unsuspicious.

The result of the service based causality analysis is a filtered service instance dependency graph 213 that only contains service instances that contribute to the initially identified abnormal operating condition.

After the contributed service instance are identified, the local contribution of each service instance (i.e. for response time related anomalies, the difference between local processing before and during the anomaly may be calculated) and the received contribution from other service instances (i.e. difference of response time of called service instance before and during the anomaly) may be calculated.

For service instances on which a significant local contribution was identified, a topology stack driven causal dependency search 215 may be performed. The topology stack driven causal dependency searches for anomalies on the processing infrastructure (i.e. process, operating system, virtualization environment) used by an identified service instance.

For some types of identified anomalies, like an increased error rate, an infrastructure impact cannot be ruled out. For such anomaly types, a topology stack driven causal dependency search 215 may always be performed.

Some variants of the disclosed technology may perform a topology stack driven causal dependency search 215 for all identified contributing service instance, yet other variants may only perform a topology stack driven causal dependency search on contributing service instance on the leaf nodes of the filtered service call dependency graph. In the example described in FIG. 2a this would be service instances CI2 and BI4.

Coming now to FIG. 2b which shows strategies to identify service instance call related causal dependencies for three exemplary types of abnormal operating conditions. Identified abnormal operating conditions on the service call level include but are not limited to response time anomalies, error rate anomalies and load anomalies.

FIG. 2b1 conceptually describes the identification of causal relationships between services showing abnormal response time behavior by an example. The exemplary service instance dependency graph 210 shows a service instance AI1, which calls service instance CI2. Service instance CI2 calls service instance DI3 which in turn calls service instance EI2. An abnormal response time behavior was detected on AI1. The service instance dependency graph indicates that AI1 depends on CI2 which in turn depends on DI3. A causality search for response time related abnormal behavior would follow the call direction of the service instance dependency graph and first check service instance CI2 for a response time related abnormal behavior that could be have caused the anomaly identified on AI1. As such an anomaly exists on CI2, the causality search is continued on service instances that are called by CI2. According to the service instance dependency graph, CI2 calls service instance DI3. An analysis of DI3 also shows a response time related abnormal behavior. DI3, in turn, calls service instance EI2. An analysis of EI2 shows no abnormal response time behavior on EI2. Therefore, the response time related causality search is terminated with service instance EI2.

FIG. 2b2 provides a flow chart that conceptually describes the causality search for response time related abnormal behavior. The process starts with step 211 when a response time change event (as e.g. created by the trigger event generator 121) is received, which indicates a specific service instance on which the response time change occurred, together with a filtered service instance call graph as described above. Following step 212 fetches services instances from the filtered service instance call graph that are called by the service instance on which the response time anomaly was detected. The fetched services are analyzed to determine whether a response time change occurred in those service instances.

Decision step 214 checks if an abnormal response time behavior was detected on at least one called service. In case no abnormal response time was identified, the process ends with step 215. Otherwise, step 213 is executed which considers the identified service instances showing a response time anomaly for further causality estimation, e.g. by analyzing service instances called by those service instances in a subsequent execution of step 212, or by performing a topology stack related causality search on those service instances.

The response time related causality search as described in FIGS. 2b1 and 2b2 performs a recursive search for abnormal response time behavior that follows the service instance call direction and that is terminated when no called services instances are found that show an abnormal response time behavior.

FIG. 2b3 exemplary shows the service instance related causality search for error rate related anomalies. The effects of error rate anomalies also travel against the call dependency of service instances, as response time anomalies do. An increased error rate of a specific service instance may impact the error rate of service instances that called the specific service instance, but it may not influence the error rates of service instances called by the specific service. In contrast to response time anomalies, the causal chain of error rate anomalies may skip intermediate service instances. As a simple example, a first service instance may require a third service instance but may communicate with the third service instance via a second service instance that only dispatches service calls. An increased error rate on the third service instance may cause an increased error rate on the first service instance, but it may not cause an increased error rate on the second service instance as this service instance only dispatches requests and responses between first and third service instance.

An exemplary service instance dependency graph 220 shows an identified error rate related anomaly on a service instance AI1. Service instance AI1 calls service instance CI2, which also shows an error rate anomaly. Service instance CI2, in turn, calls service instance DI3 on which no error rate related anomaly was detected. DI3 calls service instance EI2 which shows an error rate related anomaly.

FIG. 2b2 shows a flow chart that conceptually describes the causality search for error rate related abnormal behavior. The process starts with step 221, when a trigger event indicating an error related anomaly on a service instance, together with the corresponding service instance dependency graph is received. Following step 222 fetches all service instances that are called by the service instance indicated by the received trigger event. Decision step 224 then determines whether at least one called service instance was found. If no called service instance was found, the process ends with step 225. Otherwise, step 223 is executed which analyzes the fetched service instances to identify those service instances on which error rate related anomalies occurred and considers them for further causality analysis. Afterwards, step 222 is executed for the found called service, regardless if they show an error rate related anomaly or not.

The error rate related causality search as described in FIGS. 2b3 and 2b4 performs a recursive search for abnormal error rate behavior that follows the service instance call direction and that is terminated when no called services instances are found.

The causality analysis for service instance load related anomalies is exemplarily shown in FIG. 2b5. In contrary to the two anomalies discussed above, in which causal effects travel against the service instance call direction, load related anomalies travel with the service instance call direction. A change of the load of a specific service instance may only influence the load of service instances called by the specific service instance. It may not influence the load situation of the service instances that call the specific service instance.

An exemplary service instance dependency graph 230 shows an identified load related anomaly on a service instance EI2. As causal effect travel with the service instance call direction for load related anomalies, a search for the causes of the load anomaly identified on a service instance follows service instance call dependencies against the call direction. Therefore, the causality analysis starts with service instance DI3, as this service instance calls service instance EI2. As DI3 also shows a load anomaly, causality analysis continues with service instance CI2 which calls DI1. A load anomaly is also detected on service instance CI2. Consequently, the causality analysis continues by analyzing service instance AI1 which calls CI2. As no load anomaly can be identified for service instance AI1, the causality analysis terminated.

FIG. 2b6 shows a flow chart that conceptually describes the causality search for load related abnormal behavior. The process starts with step 231, when a trigger event indicating a load related anomaly on the service instance, together with the corresponding service instance dependency graph is received.

Following step 232 fetches those service instances that are calling the service on which the load anomaly was identified and afterwards analyzes the calling services to determine whether those calling services also show a load related anomaly. Decision step 234 determines whether at least one calling service instance was found that also shows a load related anomaly. In case no such service instances were found, the process ends with step 235. Otherwise, step 233 is executed, which considers the identified calling service instances also showing a load anomaly for further causality analysis steps.

Afterwards, step 232 is called again for those identified calling service instances.

The load related causality search as described in FIGS. 2b5 and 2b6 performs a recursive search for abnormal load behavior that follows the reverse service instance call direction and that is terminated when no calling services instances are found that show an abnormal load behavior.

Coming now to FIG. 2c which describes the concepts of the topology stack infrastructure related causality analysis for an anomaly identified on a specific service instance. The topology stack or infrastructure related to a service instance includes the topology entities that describe the processing infrastructure that is directly used by the service instance and processing infrastructure entities that compete for the same resources used by the processing infrastructure directly used by the service instance.

FIG. 2c describes a scenario in which an abnormal operating condition was detected on an instance of service S 240. The topology stack related causality analysis may first search 242 for anomalies that occurred on process A 241 that provides service S 240. Such anomalies may include but are not limited to changed CPU usage, changed memory usage or changes in memory management behavior like duration or frequency of garbage collection activities. The analysis shows no suspicious changes related to process A, therefore the hypothesis that process A is involved in a causal chain that leads to the abnormal operating condition of service instance S 240 is rejected. The causality analysis may continue to examine 245 host operating system B 247 which executes process A. The analysis of host operating system B may include but is not limited to the identification of changed CPU usage, changed main memory usage or changed usage of persistent memory. The examination of host operating system B reveals no abnormal operating condition on host operating system B 247, therefore also the hypothesis that conditions on operating system B are causally related to the abnormal operating conditions on service S 240 is rejected.

As a next step, the other processes executed on host computing system B may be examined for changed operating conditions. The examined operating conditions may include but are not limited to changes in CPU usage or changes memory usage. This analysis reveals no evidence that other processes executed on host computing system B are related to the anomalies identified on service S.

Host computing system B is a virtualized host computing system provided by hypervisor C 248. Causality analysis may continue by examining hypervisor C for abnormal operating conditions that may explain the abnormal operating conditions identified on service S 240. The examined operating conditions on hypervisor C may contain but are not limited to data describing the provisioning of CPU resources, main memory and persistent (disk) storage memories to virtual host computing systems managed by the hypervisor. The examination 246 of hypervisor C may e.g. reveal that CPU resources required by host B 147 could not be provisioned by hypervisor C during the occurrence of the abnormal operating conditions on service S. Therefore, the hypothesis that hypervisor C 248 is involved in the abnormal operating conditions observed on service S 240 is accepted. Causality analysis may continue by examining other 249 virtual operating systems provided by hypervisor C 248, which may reveal an increased demand for CPU resources on virtualized host D 250 during the occurrence of the abnormal operating conditions observed on service S 240. Therefore, the hypothesis that host D 250 is involved in the abnormal operating conditions on service S 240 is accepted. A further analysis 251 of the processes executed on host D may reveal that process G 252 showed an increased CPU usage during the abnormal operating conditions on service S 240. As no further topology elements can be identified that may cause the increased CPU usage of process G 252, the increased CPU usage of process G may be considered as the root cause for the abnormal operating conditions on service S 240.

In addition, the causal chain that connects abnormal conditions on process G with abnormal operating conditions observed on service instance S 240 via virtualized host computing system D 250, the hypervisor 248 providing host computing systems B 247 and D 250 may be reported to the user of the monitoring system. Some variant embodiments may in addition show topology entities on which no abnormal behavior was observed, but through which causal effects traveled, like host computing system B executing process A and process A providing service instance S in the causal chain.

Coming now to FIG. 3 which conceptually described data records that may be used to transfer monitoring data from agents or APIs 102 deployed to a monitored environment 101 to a monitoring server 100.

A transaction record 300 as shown in FIG. 3*a* may be used to transfer transaction trace data describing a portion of a transaction execution performed by a specific process. It may contain but is not limited to topology identification data 301 that identifies the process that performed the described portion of the transaction execution in the topology model 118, incoming service data 302 describing the service provided by the process that was used to initiate the transaction execution on the process, outgoing service data 303 describing the services provided by other processes that were called during the execution of the transaction on the specific process, correlation data 304 that may be used by the transaction trace data processor 111 to create end-to-end transaction traces out of different transaction trace records describing portions of the execution of a specific transaction, transaction performance data 305 describing e.g. the duration of individual executions of code portions like methods and functions by the transaction and timing data 306 describing the time at which e.g. calls to incoming services and outgoing services where initiated and terminated.

FIG. 3*b* shows a topology record 310 which may be used to transfer data describing the topology model 118 of the monitored system 101 from deployed agents to a monitoring sever 100. A topology record 310 contains data that identifies and describes an entity of the monitored environment like a process, host operating system of virtualization component and is used to create or update a corresponding topology entity in the topology model 118 describing the monitored environment 101. It may contain but is not limited to topology identification data 311 that identifies the described component in the topology model, topology type data 312 that determines the type of the described component, a timestamp 313 determining the time at which the data of the topology record was captured, identification data for a parent topology element 314, data further describing topology entity, communication monitoring data 316 and status update data 317.

Topology type data 312 may contain data identifying the type of the described component on a generic level by e.g. specifying whether the described component is a process, a host computing system or a virtualization component. It may further contain data that more specifically describe the type of the component, like for processes executing a virtual machine or application server environment, the vendor, type, and version of the virtual machine application server.

Parent topology identification data 314 may contain data identifying an enclosing topology entity, like for topology records describing a process, the topology identifier of the host computing system executing the process.

Descriptive data 315 may contain that further describes a reported monitored entity and may for processes e.g. contain the command line that was used to start the process, an indicator if the process was started as a background service, access privileges and user account data assigned for the process. For host computing entities the descriptive data may further describe the host computing system in terms of number, type, and performance of installed CPUs, amount of installed main memory or number, capacity and type of installed hard drives.

Communication monitoring data may be provided for topology entities of the type process and may describe communication activities performed by those process entities, e.g. in form of communication endpoint data (IP address and port) of both communicating processes, the low-level protocol used for the communication (e.g. UDP or TCP for IP based communication), and if applicable indicators identifying the client and server side of the communication activity.

Status update data 317 may contain data describing a shutdown or startup of the described entity or a change of the configuration of the described entity like the installation of a new operating system update for a host computing system or the installation of a new version of a library for processes.

A measure record 320 as described in FIG. 3*c* may be used to transfer measurement data from deployed agents or APIs to a monitoring server. A measurement record 320 may contain but is not limited to topology identification data 321 identifying the topology element that is the origin of the measurement data, measurement type data 322 determining type, meaning and semantic of the measurement, timestamp data 323 defining the time at which the measurement record was created and when the measurement value was retrieved and measurement value data 324 containing the value of the measurement at the specified timestamp.

Some variants of measure records may contain timestamp data 323 that describes a time duration and measurement value data 324 that consists of multiple values that statistically describe a set of sampled measurement values like minimum value, maximum value, number of samples and average value.

A log event record 330 as shown in FIG. 3*d* may be used to transfer log data produced by components of the monitored environment, like processes, host computing systems or operating systems and virtualization components to a monitoring server. Typically, agents deployed to the monitored environment also monitor logging activities of components of the monitored environment and transfer data describing this logging activity to a monitoring server using log event records 330.

A log event record may contain but is not limited to topology identification data 331 identifying the topology entity that produced the contained log data, a log identifier that more detailed describes the source of the log data, like a specific log file or a specific logging data category and a log entry list 333 which contains a sequence of log entries 334, each log entry 334 describing an individual log event.

Log entries 334 may contain but are not limited to a timestamp 335 determining the time at which the logged event occurred and a log message 336 that textual and semi-structured describes the logged event.

Change event records 340 as described in FIG. 3*e* may be used to describe changes that occurred in the monitored environment, like configuration changes. Agents deployed to the monitored environment may automatically detect and report those changes, or data describing such changes may automatically, semi-automatically or manually be feed into the monitoring system using APIs provided by the monitoring system.

A change event record 340 may contain but is not limited to topology identification data 341, identifying the component of the monitored environment and also the corresponding entity in the topology model on which the change event occurred, change type data 342 identifying the type of change that occurred, like a configuration change, software version change or deployment change, timestamp data 343 describing the time at which the change occurred and change description data 344 that textually, in free-text or semi-structured describes the occurred change.

Coming now to FIG. 4 which conceptually describes processes that may be used on a monitoring server to process various types of monitoring data received from agents or APIs deployed to a monitored environment.

The processing of topology records 310 as e.g. performed by a topology data processor 112 is described in FIG. 4*a*. The process stars with step 400, when the topology data processor receives topology record. Subsequent step 401 fetches the topology entity that corresponds to the received topology record from the topology model. Step 401 may e.g. use the topology identification data 311 contained in the received topology record to identify and fetch a topology node 530 contained in the topology model with matching topology identification data 531.

Following decision step 402 determines if a topology model entity (i.e. topology node 530) corresponding to the received topology record already exists in the topology model. In case none exists, step 404 is executed which creates a new topology model entity using the data of the received topology record. This also contains the linking of the newly created topology entity with its corresponding parent entity, as an example.

Otherwise, step 403 is executed, which updates the already existing topology entity with data contained in the received topology record.

Step 406 is executed after step 403 or 404 and updates the topology model with communication activity data contained in the received topology record. Step 406 may e.g., for topology records describing processes, analyze the remote endpoint data contained in communication monitoring data 316 of the received topology record to identify topology entities describing the process corresponding to the remote communication endpoints. Topology entities involved in a communication activity may be connected with a topology communication node 540 that describes the communication activity.

The process then ends with step 407.

The processing performed by the scalar measurement processor 110 to process received measurement records 320 is described in FIG. 4*b*. The process starts with step 410, when a new measurement record is received by the scalar measurement processor. Following step 411 determines the topology location of the component from which the measurement record was received, e.g. by extracting the topology identification data 321 from the received measurement record and fetching the corresponding topology entity from the topology model. Further, step 411 may extract measurement data, e.g. in form of time stamp 323 and value 324 from the receive measurement record.

Subsequent step 412 queries the measurement repository for a time series corresponding to the received measurement record. Step 412 may e.g. search for a time series record 560 with matching topology identification data 561 and measurement type data 562.

In case no matching time series is available in the measurement repository, a new one is created and its topology identification data 561 and measurement type data 562 are set to the corresponding data from the received measurement record. Afterwards, step 412 may update the fetched or created time series by adding the measurement data received with the measurement record to the time series. Subsequent decision step 413 determines if an adaptive reference value for the time series is required. An adaptive reference value, like an automatically calculated baseline value indicating a normal measurement value range for a specific measure, may e.g. be used by the trigger event generator to determine whether an abnormal operation condition (e.g. current measurement values significantly and permanently out of the normal value range indicated by the baseline) has occurred.

In case step 413 determined that an adaptive reference value is required for the currently updated time series, step 414 is executed which uses the new received measurement values to maintain and update the reference value.

After step 414, or if step 413 determines that no adaptive reference value is required, the process ends with step 415.

Coming now to FIG. 4*c* which describes the processing of received transaction trace records 330 by the transaction trace data processor 111. The process starts with step 420 when a new transaction trace record is received. Following step 421 correlates the received transaction trace record with other transaction trace data, generated from previously received transaction trace records, to incrementally create end-to-end transaction trace records. Correlation data 304 contained in the received transaction trace record, consisting of a current identifier identifying the portion of the monitored transaction described by the received transaction trace and a parent identifier identifying the transaction trace record describing the portion of the monitored transaction that caused the execution of the portion of the transaction execution described by the received transaction trace, may be used to identify and combine portions of transaction trace data into end-to-end transaction trace data.

Following decision step 422 analyzes currently available end-to-end transaction trace data to determine whether further updates to currently available end-to-end transaction trace data can be expected. Step 422 may e.g. check whether end-to-end transaction trace data contains outgoing service calls for which corresponding transaction trace data describing the processing of the outgoing service calls can be expected. If at least one such outgoing service call exists in an end-to-end transaction trace and the time elapsed since those outgoing calls occurred does not exceed a certain timeout threshold, step 422 may decide that the end-to-end transaction trace is not yet finished and terminate the process with step 429.

Otherwise, the process continues with step 423, which extracts services instance and service instance call dependencies from the finished end-to-end transaction trace followed by subsequent step 424, which updates the topology model 118 with topology entities describing the extracted service instances and their call dependencies.

Step 423 may e.g. analyze incoming and outgoing service data 302 and 304 to identify those services instances and their call dependencies. Step 424 may create corresponding topology nodes 530 describing the services instances and topology communication nodes 540 describing the call dependencies. Step 424 may further use the topology identification data identifying the processes on which portions of transactions where used to link created topology nodes describing service instances with the topology nodes describing the processes that provide those service instances. The parent topology identification data 532 of a topology node describing a service instance may be set to the topology identification data of the topology node describing the process that provides the service instance.

Following step 425 extracts measurement data for each service instance call contained in the end-to-end transaction data. The extracted measurement data may contain but is not limited to service response time measurements, service error rate measurements, service load measurements or service data transfer volume measurements.

Afterwards, step 426 is executed which fetches or creates a corresponding time series for the extracted measurement data and stores the extracted measurement data in those corresponding time series. Those time series contain data that identifies the topology entities describing the service instances from which the measures where extracted.

Next, decision step 427 is executed, which identifies those of the fetched or created time series for which an adaptive reference value or baseline is required. Step 428 is executed for the time series identified by step 427, which updates the reference value for those time series to also reflect the newly received measurement values. The process then ends with step 429.

The processing of log event records 330 by a log data processor 109 is conceptually described in FIG. 4d. The process starts with step 430 when a new log event record is received and continues with step 431 which analyzes the received log event record to identify groups of similar log entries and creates data describing those groups of log entries. Following step 432 creates a log summary record 570 that contains a summary of the data received with the log event record, e.g. containing data identifying the origin of the log data, the time period covered by the log data contained in the received log event record and data describing identified groups of similar log entries. The create log summary record may be stored in the log data repository 138 and the process ends afterwards with step 433.

Coming now to FIG. 5 which conceptually describes data records that may be used to store intermediate analysis results of incoming monitoring data received from agents or APIs on the monitoring server.

Processing trace nodes 500 and trace communication nodes 520 as described in FIGS. 5a and 5b may be used to store end-to-end transaction trace data.

Processing trace nodes 500 describe portions of a monitored transaction that were executed on a specific process and trace communication nodes 520 describe transaction related communication activities that occurred between different portions of monitored transactions that were executed on different processes.

A processing trace node 500 may contain but is not limited to topology identification data 501 which identifies the topology entity representing the process that performed the portion of a transaction execution described by the processing trace node 500, correlation data 502 which identifies a portion of a transaction execution performed by a specific process, incoming service data 503 describing the incoming service call that caused the described portion of the transaction execution, outgoing service data 507 describing the service calls performed by the described portion of the transaction execution, and payload data 512 describing performance and functional aspects of the described portion of the transaction execution.

Incoming service call data 503 may be used to describe the service provided by a process that was requested by a monitored transaction to perform some transaction related executions by the process. Incoming service data 503 may contain but is not limited to a service topology identifier 505 identifying the service instance in the topology model and service detail data describing e.g. type and access data of the service. Examples of service types are e.g. HTTP services or remote method invocation (RMI) services. Corresponding access data would be an URL for a HTTP service and method name and method parameters for an RMI service.

Outgoing service call data 507 describes services that were requested from other processes during transaction related processing on a specific process. Outgoing service call data 507 may contain multiple service call data records 508, each service call data record describing a performed outgoing service call.

A service call data record 508 may contain but is not limited to service topology identification data 509 identifying the called service instance in the topology model, service detail data 510, describing service details like type and access data of the called service and call context data 511, describing e.g. where and when the outgoing service call was performed during the processing performed by the in specific process, e.g. in form of a name of the code function or method that performed the call in combination with method/function call nesting data. In addition, call context data may contain data describing parameter values used by the service call and it may also contain data indicating whether the service call was successful.

A trace communication node 520 as shown in FIG. 5*b* may be used to connect two communicating processing trace nodes, of which one processing trace node triggered the execution of the other process tracing node by a service call.

A trace communication node 520 may contain but is not limited to sender data 521 identifying the process tracing node that acted as the sending part in the described communication and receiver data 525 identifying the processing trace node that describes the processing of the service call on a receiving process.

Sender data 521 may contain but is not limited to correlation data 522 identifying the processing trace node 500 that initiated the described communication and call context data 523 containing data locating the service call within the processing described by the sending process trace node and data describing service call parameters and service call success indicators.

Receiver data 525 may contain but is not limited to correlation data 526 identifying the processing trace node 500 that received and processed the service call and service topology identifier data 527 that identifies the called service in the topology model.

A topology node record 530 as shown in FIG. 5*c* may be used to describe components of the monitored environment in the topology model. A topology node 530 may contain but is not limited to topology identification data 531 that uniquely identifies the topology node in the topology model and that also uniquely identifies the component of the monitored environment described by the topology node, parent topology identification data 532 identifying the parent or enclosing topology node for a given topology node, entity type data 533 describing the type of the topology entity described by the topology node and descriptive data 534 that further describes the topology entity. Examples for topology parent relationships described by parent topology data are processes executed by a host computer system, where the host computing system is the parent entity or service instances provided by a process, where the process is the parent entity.

FIG. 5*d* shows a topology communication node 540 which may be used to describe monitored communication activities between topology entities like processes. Those communication activities are based on low level, network related monitoring and do not contain transaction context data as e.g. communication trace nodes 520. A topology communication node 540 may contain but is not limited to client topology identification data 541 identifying the topology entity representing the process that initiated the communication, server topology identification data 542 identifying the topology entity representing the process that received the communication and communication type data 543 that e.g. specifies the protocol used for the communication.

Maintenance window records 550 as shown in FIG. 5*e* may be used to describe planned maintenance activities on components of the monitored environment that may have an adverse effect on the performance or functional behavior of the monitored environment. Maintenance window data may be entered by a user of the monitoring system. A maintenance window record 550 may contain but is not limited to topology identification data 551 identifying the topology entity that is affected by the maintenance activity, time range data 552 specifying the time at which the maintenance will take place and maintenance type data 553 further specifying which type of maintenance is performed, e.g. hardware or software related maintenance, maintenance of network infrastructure etc. Some variant embodiments may provide maintenance window records containing a list of topology identification data for the description of maintenance activities that affect multiple topology entities.

A time series record 560 as described in FIG. 5*f* may be used to store time series data generated by the monitoring system. A time series record 560 may contain but is not limited to topology identification data 561 identifying the topology entity that is the origin of the time series data stored in the time series record, measurement type data 562 describing the type and the meaning or semantics of the measurement and a data point list 563, containing data point entries 564. A data point entry 564 represents an individual measurement at a specific point in time and contains time stamp 565 and measurement value 566 data.

Log summary records 570, which are described in FIG. 5*g* may be used to store data describing monitored logging activity. A log summary record 570 may contain but is not limited to topology identification data 571 identifying the topology entity on which the logging activity was monitored, a log identifier 572 specifying the source of the log activity data within the topology entity, time range data 573 specifying the time range covered by the log summary record and a log entry list 574 containing log entry records 575 that provide summary of the monitored log activity. A log entry 575 represents an identified group of similar log entries and contains log group data 576 describing an identified group of similar log messages, e.g. by a representative log message or the portions of the log message that all log messages of the group have in common, and log group quantity data 577 e.g. describing the number of log messages in a log group. Log summary records may, in addition, contain data describing the overall logging activity, like e.g. the number of log messages that occurred during the time range covered by the log summary record.

Coming now to FIG. 6 which conceptually describes the creation of trigger events by the trigger event generator 121. The trigger event generator monitors portions of the monitored environment that are crucial for the functionality provided by the monitored environment. Those portions may contain services or service instance that provide functionality to end users and that are relevant for the economic value of the monitored environment, like the generated revenue. Examples are services that provide interfaces to purchase goods via the monitored environment, like services that provide product catalogues or features to purchase products via web pages.

In addition, some more hardware/infrastructure related entities like host operating systems or processes that provide functionality that is essential for the overall function of the monitored environment may be monitored by the trigger event generator.

FIG. 6*a* describes the process performed by the trigger event generator to monitor time series based anomalies. The process is performed cyclically, (e.g. every 30 seconds, very minute, every 5 minutes etc.) and starts with step 600 by fetching all selected time series (i.e. time series describing performance and functionality of crucial services). Subsequent steps are executed for each selected time series. Following step 601 uses the reference value of the currently processed time series to determine if the measurement values of the time series indicate an abnormal behavior. Step 601 may e.g. determine whether the measurement values of the time series was significantly out of a desired value range defined by the reference value for at least a specific time.

Following decision step 602 executes step 603 in case an abnormal operating condition was detected and creates a trigger event describing the type, topological location and time of the abnormal event. The created trigger event may then be forwarded to the causality estimator 131 to identify the causal chain and if possible, the root cause that led to the abnormal operating condition. The process then ends with step 604 after step 603 or in case no abnormal condition was detected.

Coming now to FIG. 6b which describes the monitoring of topology entities by the trigger event generator. The process is performed cyclically, (e.g. every 30 seconds, very minute, every 5 minutes etc.) and starts with step 610 by fetching availability data for all selected topology entities. The selected topology entities may provide critical functionality of the monitored environment, like a centralized data base service that may be executed by a set of clustered processes running on different host computing systems. The trigger event generator may monitor the availability of both host computer systems and processes.

Subsequent steps are executed for each selected topology entity. Step 611 analyzes the availability data of the topology entity to determine if it indicates an abnormal operating condition. Availability data indicating that the entity is currently unavailable, or that the availability of the entity was below a certain threshold (e.g. 80% of the time) during a certain observation period (e.g. last 1,5, or 10 minutes) may describe an abnormal operating condition.

Following decision step 612 executes step 613 in case an abnormal operating condition was detected and creates a trigger event describing the type, topological location and time of the abnormal event. The created trigger event may then be forwarded to the causality estimator 131 to identify the causal chain and if possible, the root cause that led to the abnormal operating condition. The process then ends with step 614 after step 613 or in case no abnormal condition was detected.

Data records that may be used to create and store causality graphs are shown in FIG. 7.

A causality determination rule 700 as shown in FIG. 7a defines conditions that need to apply to an already identified abnormal condition on a specific topology entity, conditions that need to apply on another topology entity to justify a causal related abnormal condition on the other topology entity, a specification of required evidence data in form of required monitoring data to determine the existence of a causal related anomaly on the other topology entity and processing definitions describing the processing of the evidence data.

A causality determination rule 700 may contain but is not limited to applicability criteria data 701 defining type and location of an observed event or abnormal operation condition that must be met to apply the rule, acceptance criteria 704 defining type, location and temporal aspects of another event or abnormal operating condition on another topology entity that must be fulfilled to accept a causal relationship, required evidence data 709 which defines the monitoring data required to evaluate the rule, an evidence data processing definition 712 defining the methodologies and technologies that should be used to analyze the evidence data and a causality weight calculation type 715 indicating how the weight or strength of an identified causal relationship should be calculated.

Applicability criteria 701 may contain but is not limited to event type criteria 702 defining the type of event (e.g. value of measure of a specific type out of expected value range, unexpected unavailability of a topology entity of a specific type) and event location criteria (i.e. the type of the topology entity on which the event occurred).

Acceptance criteria 704 may contain but is not limited to event type criteria 705, serving the same purpose as event type criteria of the applicability criteria, event location criteria 706, that specifies a type of topology entity on which a search for a causal related event should be performed, event type specific acceptance criteria 707 which e.g. specifies a minimal, event type specific extend and duration of a detected change to be accepted as abnormal operating condition, and acceptance temporal focus data 708 which defines relative temporal criteria between the observed abnormal operating condition and a new detected potentially causal related abnormal operating condition that are required to accept the new detected abnormal operating condition as causal related.

The event location criteria 706 of acceptance criteria 704 may also contain restrictions relative to the event location criteria 703 of the availability criteria. Those relative restrictions may contain but are not limited to "occurs on same host computing system", indicating only events that happened on the same host computing system on which also the already observed abnormal operating condition was observed, "occurs on host computer system of process" indicating that only events on the host computing system executing the process on which the known abnormal operating condition was observed are accepted or "occurs on same entity" indicating that only local events that happened on the entity on which also the known abnormal operating condition occurred are accepted.

The acceptance temporal focus 708 defines a time frame in which detected events are accepted as causal related to the already known event that is relative to the time on which the already known event occurred. Conceptual examples of temporal focus definitions include but are not limited to "100 to 500 milliseconds before time of known event" to search for a cause of an event 100 to 500 milliseconds before the event occurred, or "0 to 700 milliseconds before time of known event" to search for a cause of an event up to 700 milliseconds before the event occurred.

Required evidence data 709 may contain but is not limited to an observation period 710 defining the time period from which monitoring data is considered to determine the existence of an abnormal operating condition (this may differ from the acceptance temporal focus as e.g. more data may be required to determine the existence of an abnormal operating condition than it is covered by the duration of the abnormal operating condition), and monitoring data description 711 defining the type of monitoring data, like specific time series, specific topology entities and their status data like an availability status that is required for the identification of an abnormal operating condition.

Evidence data processing definition 712 may contain but is not limited to a process type 713 specifying the process that should be applied to identify an abnormal operating condition, like e.g. identification of change points in time series (described later in this disclosure), baseline related determination of abnormal conditions or changes in availability states of topology entities and process parameter data 714 that may be used to parameterize the evidence data process defined in 713.

A causality hypothesis record 710 as shown in FIG. 7b may be used to describe a hypothesis that was established by the evaluation of a causality determination rule and may be used by the causality estimation system for performance improvements to identify and reuse the results of already checked hypotheses to avoid unnecessary equivalent hypothesis checks. A causality hypothesis record 710 may contain but is not limited to acceptance criteria 711, which is typically a copy of the acceptance criteria 704 of the causality rule 700 that was used to establish the hypothesis.

Causality event records 720 and causality edge records 730 as shown in FIGS. 7c and 7d may be used to represent identified causal relationships between identified abnormal operating conditions in form of a causality graph.

A causality event record 720 describes an identified abnormal operating condition and may contain but is not limited to topology identification data 721 identifying the topology entity on which the event occurred, event identification data 722 identifying the causality event record 720, transition time data 723 describing the time period in which the observed operating conditions went from normal to abnormal, event type data 724 describing the type of occurred event, e.g. in form of the type of the measurement that showed an abnormal condition, or the type of the topology entity that showed an unexpected availability state, a severity indicator 725 that describes the severity of the observed abnormal condition, e.g. in terms of the extend to which the observed abnormal condition differs from a normal operating condition, evidence data 728 that stores the evidence data that was used to identify the abnormal condition to e.g. later reconstruct and reassess the reasons that led to the detection of the abnormal operating condition, and a hypothesis reference 727 referring to the hypothesis record 711 that describes the hypothesis that led to the identification of the event.

A causality edge 730 describes the causal relationship between two causality events 720 and may contain but is not limited to a cause event identifier 731 identifying the causality event record describing an event that acts as the cause in the described causal dependency, an effect event identifier 732 identifying the causality event record describing an event that acts as the effect in the described causal dependency and a causal weight factor 733 defining the degree of the causal impact or the probability that a causal impact exists. The causal weight may be calculated based on the timing of both involved events or on heuristics describing a causal weight based on the types of the involved events.

Coming now to FIG. 8 which conceptually describes the processing performed by the causality estimator 131 on receipt of a trigger event to identify other events or abnormal operating conditions that have a causal relationship to the trigger event.

The processing starts with step 800 of the initial causality estimation process described in FIG. 8a when a new trigger event is received by the causality estimator. Following step 801 creates a new causality graph that contains a causality event record representing the trigger event. Following step 802 calculates the causal dependencies of the received trigger event. A detailed description of step 802 can be found in FIG. 8b. The process then ends with step 803.

The process of calculating the causal dependencies of an event is depicted in FIG. 8b. The process starts with step 810 when an event for causal analysis is received (e.g. step 802 of process "Initiate Causality Estimation" or step 837 of process "Evaluate Hypothesis on Entity"). Following step 811 fetches those causality rule records 700 from the causality rule set repository 130 of the causality estimator 131 that have applicability criteria 701 that matches the received event. E.g. the type of the received event matches the event type criteria 702 and the type of the entity on which the event occurred is covered by the event location criteria 703. Following step 812 evaluates the fetched causality rules to determine the existence of other events with a causal relation to the received event. Step 812 is described in detail in FIG. 8c. The process then ends with step 813.

FIG. 8c describes the processing of a causality rule 700 by the causality estimator 131. The process starts with step 820 when a causality rule and an input event was received, e.g. by the execution of step 812 of the process "Calculate Causal Dependencies of Event". Following step 821 fetches those topology entities from the topology model that are topologically reachable form the entity on which the received event was observed and that match the event location criteria 706 of the acceptance criteria 704 of the currently processed causality rule. Topologically reachable means in this context that an entity is either in a parent/child relationship (e.g. a process running on a host computing system), shares a parent entity (e.g. processes on same host computing system) or is involved in observed communication activity with the entity on which the input event occurred. The fetched or candidate topology entities may also contain the topology entity on which the input event was observed. Following step 822 creates a hypothesis record 710 for each candidate topology entity and subsequent step evaluates the created hypotheses to identify causally related events on the candidate entities.

The created hypothesis records may be used by the causality estimator to document already evaluated acceptance criteria on individual candidate entities. This enables the causality estimation system to reuse already performed acceptance criteria evaluations. This may be the case when two different causal paths join at a candidate entity and those paths may require identical acceptance criteria, either from the same or from different causality rule records 700. In this case, the system may evaluate the acceptance criteria on the join candidate entity for the first path and store it in form of a hypothesis record 710. When the second path is analyzed, and reaches the join candidate entity, the acceptance criteria may not be evaluated a second time, but the already created and store causality hypothesis may be used instead. A causality estimation according to the disclosed technologies is also possible without the creation of hypothesis records but would in this case be less efficient.

The evaluation of created hypotheses is described in detail in FIG. 8d. The process then ends with step 824. Some variant embodiments and some causality rule variants may create multiple hypotheses per candidate topology entity.

The process of the evaluation of hypotheses to determine the existence of causally related events is described in FIG. 8d. The process starts with step 830 when a hypothesis 710 and an input event is received, as by the execution of step 823 of process "Evaluate Causal rule in Event". Following step 831 analyzes the currently existing causality graph, whether it already contains an event record that is based on a hypothesis that is equivalent to the received hypothesis. Two hypotheses may be considered as equivalent if they have the same acceptance criteria and the topological location on which they have been or should be evaluated is identical. In other words, it may be said that two equivalent hypotheses check the same condition on the same location. Therefore, it may be reasonable to check if an equivalent hypothesis was already evaluated in the scope of the current causality graph and in this case reuse the outcome of this hypothesis.

Following decision step 832 continues with step 833 in case an equivalent hypothesis was found in the causality graph. The existence of an equivalent hypothesis indicates that the currently processed hypothesis was established and accepted via another identified causal path in the currently existing causality graph. In this case, no new causality nodes need to be added to the graph, only new edges that describe new causal dependencies between already identified events are added by step 833. Step 833 may create causal edge records that connects the event record which caused the creation of the currently processed hypothesis (see FIG. 8c) with those events that are based on the already existing equivalent hypothesis, as in this case, the currently processed hypothesis did not generate a new event for the causality graph but only added a new causal connection between already existing events. Step 833 may in addition check if such connections already exist and only create causal edge records for those connections that are missing. After step 833, the process ends with step 839.

If no equivalent hypothesis was found on step 831, decision step 832 continues the process with step 834 which evaluates the received hypothesis on the received input entity. In other words, it may be said, step 831 verifies if the operating conditions indicating an abnormal operating condition as described by the received hypothesis really occurred on the received entity. A detailed description of the processing performed by step 834 is provided in FIG. 9.

Following decision step 835 evaluates the outcome of the hypothesis evaluation. In case the received hypothesis was not correct, the process ends with step 839.

In some variant embodiments of the disclosed technology, the discarded hypotheses may be temporarily stored during the processing of a causality graph. In those variants, step 831 may in addition to search equivalent hypothesis in the currently existing causality graph, also search for equivalent hypotheses in the stored discarded hypotheses. In case a discarded hypothesis that is equivalent to the currently processed hypothesis is found in the temporal storage of discarded hypotheses, the process may terminate with step 839 without changing the causality graph.

In case the hypothesis was correct, decision step 835 continues the process with step 836, which creates a causality event record 720 describing the identified abnormal condition or event that was confirmed by the hypothesis evaluation in step 834. Step 836 may also add the received hypothesis to the created causality event record, e.g. by setting the hypothesis reverence 727 to refer the received hypothesis.

Following step 837 connects the newly created causality event record to the event record already existing in the causal event graph that caused the creation of the received hypothesis. This adds the newly created causality event record to the causality event graph.

Afterwards, step 838 is executed which continues the search for further abnormal operating conditions or events that are causal related to the event that was newly added to the causality graph in step 837. Step 838 may e.g. execute the process described in FIG. 8b to continue a recursive search for causally depending events.

Steps 836 and 837 extend the already known causal event graph with a new event describing a new identified abnormal operating condition that has a causal relationship with one or more events already existing in the graph. Step 838 then continues the search for other abnormal operating conditions that are causal related to the new added event.

Generally, the process described in FIG. 8a may be considered as a recursive function that search for directly and indirectly causal related abnormal operating conditions for a given received trigger event. FIGS. 8b, 8c and 8d perform the recursive search, where the path indicating an incorrect hypothesis (decision step 835 indicates that acceptance criteria is not fulfilled) and the path indicating an already evaluated hypothesis (process path passing step 833) in FIG. 8d are the base cases of the recursion causing no update to the causality graph, and the path indicating a correct hypothesis (decision step 835 indicates that acceptance criteria is fulfilled) is the recursive case which first adds a new event describing a new detected, causal related abnormal operating condition to the causality graph and then continues a recursive search for other causal related abnormal operating conditions explaining the new added event. This recursive search then starts with step 838.

The overall process to identify causally related events terminates when all recursive searches are exhausted, e.g. if for all paths of the causality graph no more candidate topology entities could be found (step 821), or if no more evaluated hypothesis is accepted.

Coming now to FIG. 9 which exemplary shows the evaluation of a hypothesis on a topology entity. The process starts with step 900 when a new hypothesis and a candidate entity is received (e.g. during the execution of step 834 of process "Evaluate Hypothesis on Entity"). Following step 902 fetches the required observation data for the candidate entity as defined by the required evidence data definition 709 of the causality determination rule 700 that led to the creation of the received hypothesis 710. Step 902 may e.g. fetch measurement data or availability state data as defined in the monitoring data description data 711 corresponding to the received candidate entity for the time frame defined in the observation period data 710.

Following step 903 may analyze the observation data fetched by step 902 to determine whether the observation data indicates a significant change during the acceptance focus period 708 of the causality determination rule used to create the received hypothesis. Step 903 may e.g. process the evidence data according to the evidence data definition 712 of the causality determination rule and then compare the results of the performed processing with the event type specific acceptance criteria 707 to determine the existence of a significant change or abnormal operating condition during the acceptance temporal focus of the causality determination rule 700.

Following decision step 904 evaluates the result of step 903 and in case no abnormal operating condition or significant change was indicated, continues with step 907 which indicates no causal dependency, respectively the absence of an abnormal operating condition and the rejection of the received hypothesis. The process then ends with step 908.

If otherwise an abnormal operating condition was identified by step 903, decision step 904 continues the process with step 905 which tries to more exactly determine the time period in which the change occurred and if possible, tries to determine a severity measure for the identified abnormal operating condition. Step 903 only determined the existence of an abnormal operating condition during the rule acceptance focus period, but step 905 may identify the most exact time frame in which the operating conditions went from normal to abnormal. This time frame may be smaller and therefore more exact than the rule acceptance focus period. The severity of a change may e.g. be determined by comparing measurement values indicating normal and abnormal operating conditions. Exemplary severity indicators may include but are not limited to "CPU usage is 50% higher than normal", "Memory usage is three times higher than normal" or "Throughput is 20% of normal".

Following step 906 indicates the existence of a causal dependent abnormal operating condition with the determined type, severity and occurrence time frame. The data provided by step 906 may be used to create a corresponding causality event record describing the identified event. The process then ends with step 907.

FIG. 10 describes an exemplary causality graph as e.g. created by the processes described in FIGS. 6, 8 and 9. The exemplary causality graph starts with an event 1000 describing a response time degradation on a service $S_A$, which is, according to the causality graph, caused by a response time degradation 1001 on a service $S_C$. The causal dependency between the events identified on service $S_A$ and $S_C$ may be determined using service call dependencies that e.g. indicate that service $S_A$ calls service $S_C$, as e.g. described in FIGS. 2a and 2b. Further, the causality graph shows a response time degradation 1002 on service instance $S_{CI1}$ of service $S_C$. Event 1002 and its causal dependency to event 1001 may also have been determined as described in FIGS. 2a and 2b.

After the response time degradation on service instance $S_{CI1}$ 1002 was identified as cause for the monitored response time degradation on service $S_A$, the topology stack of $S_{CI1}$ is investigated, e.g. as described in FIG. 2c. The investigation may include evaluating the causality rules "High CPU on service instance process" on $S_{CI1}$ and evaluating the causality rule "High CPU on host of process" on process P1 providing service instance $S_{CI1}$. The hypothesis "High CPU on service instance process" may be rejected because no abnormal behavior can be identified on P1. The hypothesis "High CPU on host of process" applied on P1 may reveal unexpected high CPU usage on host $H_1$ which is executing process P1. Consequently, this hypothesis may be accepted and create event 1003.

The investigation may continue by evaluating the causality rule "High CPU on unrelated process of same host" for host H1, which may reveal unexpected high CPU usage of process P2 running on $H_1$, which leads to the creation of event 1004 indicating a high CPU usage on process P2 running on host $H_1$.

From event 1004 the investigation may continue by the evaluation of the causality rules "Process start activity during observation period" and "Maintenance window during CPU observation period". The investigation may show evidence for both hypotheses which leads to the creation of event 1005 indicating that process P2 was started on host $H_1$ during the observation period and to the creation of event 1006 indicating that a maintenance window was scheduled for process P2 during the observation period.

After the creation of events 1005 and 1006, no more causality rules may be available or no more connected topology entities may be available for a further investigation, therefore the investigation ends with the creation of those events.

Coming now to FIG. 11 which exemplary describes the usage and relations of observation period 710, acceptance temporal focus 708 of causality determination rules 700 and transition time data 723 of causality events. In addition, FIG. 11 provides an exemplary list of causality determination rules.

Time lines describing multiple exemplary, causal related events with their corresponding evidence period, observation period and acceptance temporal focus period are shown in FIG. 11a.

Graph 1100 starts with the evidence period of an event A. Event A may have been identified by the trigger event generator which started a search for causally related events that explain why event A occurred. The search for causal events may select a rule 1 to be applied on event A. Rule 1 may define an observation period which defines the period of observation data used by rule 1 relative to the timing of event A. (Rule 1 may e.g. specify that the observation period starts 500 milliseconds before the occurrence of the assumed effect, which is event A, and ends 100 milliseconds before the assumed effect). Further, rule 1 may specify an acceptance temporal focus period, also relative to the timing of event A. Application of rule 1 to event A may reveal an event B with an evidence period indicating that event B occurred during this period.

The causal search may after the identification of event B apply rule 2 on event B to find further events that explain the existence of event B.

Rule 2 may define an observation period past and an acceptance temporal focus period that reach further into the. Evaluation of rule 2 may reveal the existence of event C and event D. As seen in graph 1100, event C occurred within the acceptance temporal focus of rule 2 and event D occurred before. As a consequence, the hypothesis that event C is causal related to B is accepted and the hypothesis that event D is causally related to event B is rejected.

Coming now to FIG. 11b which provides a list 1110 of exemplary causality rules. The first exemplary rule defines how to search for a causal depending service response time degradation for an observed service response time degradation. The applicability criterion of this rule is "service response time degradation" which means that this rule may be applied to an observed degradation of the response time of a specific service. The acceptance criterion is "service degradation on called service", which means that a hypothesis based on this rule may be accepted when a service degradation on a service called by the specific service is detected. Evidence data for this rule may contain monitored transaction traces that used both services (i.e. the specific service with the observed response time degradation and another, candidate service which is tested for the existence of a response time degradation). Evidence data processing may contain identifying those transactions that show a response time degradation on both services. The causal weight of a causal dependency identified by this rule may be calculated as the ratio between all transactions showing the observed response time degradation and transaction showing a response time degradation on both services.

The second rule may be used to search for a causally related response time degradation on a service instance for a given observed response time degradation on a service. As for the first rule, the applicability criterion is a service response degradation on a specific service. The acceptance criterion contains a service response degradation on a service instance corresponding to the specific service, evidence data includes transactions using the service instance, and evidence processing may include identifying transaction traces showing a response time degradation on the service instance. The causal weight may be calculated as the quotient between all transactions using the service instance and those transactions using the service instance that show a response time degradation.

The next rule has a response time degradation on a service instance as applicability criterion and high CPU usage on the process providing the service instance as an acceptance criterion. This rule may be used to identify a causally related increase of CPU usage by a process providing a service on which a response time degradation was observed. The evidence data may contain metric time series data describing the CPU usage of the process over time, evidence data processing may include identification of change points on the metric (for a detailed description of processed to identify change points in time series see FIGS. 14 and 15) and the causal weight may for this rule be calculated based on the temporal distance between the observed response time degradation on the service instance and the change point of the CPU usage by the process.

The following rule is similar to the previous one, the only difference is that a change point is searched in the CPU usage time series of the host computing system executing the process that provides a service with an observed response time degradation.

The next rule has a high CPU usage on a process as applicability criterion and a high CPU usage on the host running the process as an acceptance criterion. This rule may be used to determine whether a high CPU usage on a host computer is caused by an observed high CPU usage on a process executed on the host computer. Evidence data may include CPU metric data of the host computer system and evidence data processing may include change point detection. The weight of a causal dependency identified by this rule may be calculated based on the temporal distance of both events.

The following rule represents the logical inversion of the previous rule as it starts with an observed high CPU usage on a host computing system and searches for a causing high CPU usage on a process.

The next rule may be applied to an observed high CPU usage on a host computing system to search for a process start on the host computing system that causes the high CPU usage. The evidence data of this rule may include process availability metrics and evidence processing may include change point detection on process availability metrics and the detection of topology changes. The causal weight may again be calculated based on the temporal distance of both events.

The following rule may be used on an observed high CPU usage on a process to identify a causal relation to a maintenance window defined for this process. Evidence data may include data describing known maintenance windows for the process and evidence processing may include the analysis of the timing data of the registered maintenance windows of the process. The causal weight may be calculated based on the temporal distance between the event and registered maintenance window or the degree to which maintenance windows overlap with the duration of the high CPU usage event.

The last rule has the broadest applicability criterion, indicating any event. It may be applied to any observed event and may be used to identify topological availability changes that may have a causal relation to the observed event. Evidence data may contain availability data of entities that are topologically reachable from the entity on which the observed event occurred, and evidence processing may include a comparison of the availability data before the observed event occurred with availability data during the time the event was observed. The causal weight may again be calculated based on the temporal distance between the observed event and identified availability changes.

Coming now to FIG. 12, which shows the flow chart of a process that may be used to merge multiple identified local event graphs into one global event graph.

The process is executed cyclically (e.g. every 10 seconds, every minute etc.) and starts with step 1200 which fetches all local causality graphs that were created since the last run of the merge process. The subsequent steps are executed for each causality event record in each of the fetched local causality graphs.

Step 1201 fetches data describing the topology location, the event type and the timing data of the currently processed event and subsequent step 1202 queries events that are equivalent to the currently processed events. Events may be considered as equivalent if they have the same type and happened on the same entity location at the same or nearly the same time.

Following steps are executed for each identified equivalent event. Decision step 1203 determines whether the currently processed equivalent event indicates a graph merge.

A graph merge may be indicated for events that directly report a change of the operating conditions of monitored entities, like changed service response times, service error rates, or changed process/host CPU or memory usage.

Events that do not directly indicate such a fundamental change but only indicate a suspicious situation but no concrete change of operating conditions, like changes in the logging behavior of monitored processes or operating systems, may indicate no graph merge.

In case decision step 1203 determines that the currently analyzed events indicate no graph merge, step 1204 is executed which marks the equivalent events as being shared by the local causality graphs containing those events. As an example, the equivalent events may be augmented with references that connect them.

When step 1203 determines that the analyzed equivalent events indicate a graph merge, step 1204 is executed which merges the graphs containing the equivalent events. Step 1204 may first merge the two equivalent events into one event, e.g. by creating a new event having the same event type and topology location as the two equivalent events and having event timing data that combines the event timing data of both events (e.g. taking the earlier event start time and the later event end time of both events). Al1 incoming causal connections pointing to the equivalent events (i.e. causal edge records 730 with an effect event identifier 732 identifying one of the equivalent events) may be changed to point to the new create combined event and all outgoing causal connections that originate from one of the equivalent events (i.e. cause event identifier 731 pointing to one of the equivalent events) may be changed to originate from the new combined event. This creates a merged event graph out of the two local event graphs that are connected via the new combined events. The process then ends after step 1204 or 1205 with step 1206.

After the process described in FIG. 12 has been finished for all new created local event graphs, all new local event graphs that had at least one event that was equivalent with an event in another new local event graph were merged. Multiple local event graphs (more than two) may be merged into one graph and some local event graphs may stay separate as they contain no event that has an equivalent in another local event graph.

Some embodiments of the disclosed technology may, after performing the processing as described in FIG. 12 with new created local event graphs in a first merge step, perform a second merge step that is similar to the processing in FIG. 12 with the new event graphs generated in the first merge step and event graphs that were already published to users of the monitoring system. The second step may also identify equivalent event nodes in different event graphs and merge event graphs containing equivalent events. But different to the first step, the second step may differentiate between already existing and published event graphs and new event graphs by merging new event graphs into existing ones to preserve the existence of already published event graphs. As an example, if two new graphs A and B are merged, they may create a new graph C. As neither A, B, and C were published to a user, this behavior is acceptable. In case an already published graph E and a new graph F are merged, the new graph is merged into the published graph E which is increased by the subgraph provided b F. No new graph is generated. Instead, published graph E grows instead of being exchanged by a new graph. Merging event graphs in this second stage may in some cases cause the situation that a new event graph would connect two already published graphs. In such cases, the new event graph may be merged into both published event graphs. Those two published event graphs may be marked or tagged as event graphs sharing a sub graph.

A process that may be used to determine the root cause event within a previously calculated causality event graph is shown in FIG. 13. The process starts with step 1300 when a newly completed event graph is received or in case an existing event graph was updated because a new event graph was merged into it. The process is executed for all causality event records that represent trigger events (i.e. causality event records for which no cause event is known). As global event graphs may be the result of multiple merged local event graphs, each local event graph containing one event record representing a trigger event, global event graphs may contain multiple trigger events.

Following step 1301 selects the current trigger event node as the current node and subsequent step 1302 identifies those event nodes that are directly reachable from the current node, i.e. those nodes that are connected with the current node via a causality edge 730 in which the current event node is identified as cause event. Following decision step 1303 determines whether directly reachable events are available. In case no directly reachable events are available, step 1304 is executed which indicates the current event record as root cause event. The process then ends with step 1311. If otherwise, one or more reachable event records are available, decision step 1305 is executed which determines if only one or multiple reachable event records where identified. In case of only one reachable event record, the process continues with step 1306 which selects the single reachable event record as current event record and then continues with step 1302.

In case multiple reachable event records were found, step 1307 is executed which determines if the causal weights 733 of the causality edges 730 connecting the current event record with the identified reachable event records are comparable. Weight factors may be considered as comparable if they are based on the same type of data. A weight factor based on transaction execution counts may be comparable with another weight factor based on transaction execution counts, but it may not be comparable with another weight factor based on the temporal distance or overlap of events.

In case step 1308 determines that the weight factors are comparable, then step 1310 is executed which selects the reachable event with the highest weight factor as current event. Afterwards, the process continues with step 1302.

Step 1309 is executed when step 1308 determines that the causal weights are not comparable. In this case, step 1309 is executed which follows the causal path of each reachable event, e.g. by continuing the process with step 1302 for each reachable event record. This leads to the identification of multiple root cause events.

Variant embodiments may in this case use heuristics based on the types of the reachable events and the current event to identify the reachable event that most probably leads to the root cause event and continues by executing step 1302 for this identified event record.

Yet other variant embodiments may use only comparable causal weights, e.g. by restricting input data for the causal weight calculation to data that is available for all combination of event types. An example of such data that is always available may include event timing data. A causal graph that only contains comparable causal weight may then be analyzed by known graph analysis algorithms, like the page rank algorithm to identify those event records that have the highest accumulated impact on other events in the graph and select those event records as root cause events. U.S. patent application Ser. No. 15/267,867 "Method and System for Real-Time Causality and Root Cause Determination of Transaction and Infrastructure Related Events Provided by Multiple, Heterogeneous Agents" which is included herein by reference in its entirety, describes such a root cause detection system.

Coming now to FIG. 14 which provides flow charts of processes that may be used to identify significant change points in time series data. FIG. 14a describes the overall process of change point identification and FIG. 14b shows the process of calculating a change point candidate as required by the overall change point identification process.

The process of identification a change point starts with step 1400 when time series data consisting of data points, each data point containing at least a measurement value and a corresponding timestamp is received for analysis to determine whether a significant change point of the measurement values of the time series occurred. A change point may be considered as a specific point in time for which all measurements of data points of a time series with a timestamp before the specific point in time significantly differ from the data points with a timestamp after the specific point in time. Data describing a change point may, in addition, contain the direction of the change (i.e. smaller/greater values) and the extend (e.g. percentage) of the change.

Following step 1401 sorts the received data points ascending by their timestamp in chase they were not already sorted. Step 1402 afterwards calculates a change point candidate from the time series data as described in FIG. 14b. The execution of step 1402 may the provide timestamp at which, according to a specific statistical test, the difference between the measurement data before the timestamp and after the timestamp is maximized. Step 1402 may further provide data describing the direction and extend of the difference. Following decision step 1403 may determine if the identified maximum difference exceeds a certain threshold and may, therefore, be considered as a significant change. In case the detected maximum change does not exceed the threshold, the process continues with step 1409 which indicates that no threshold was detected and the process ends with step 1411.

If otherwise, the identified change exceeds the threshold, step 1404 is executed, which shuffles the data points of the time series to create a time series containing the same measurement values, but in a different, random sequence. The fisher-yates shuffle algorithm, which is a standard algorithm known in the art for the efficient generation of random permutations of elements may be used by step 1404 to create the random sequence of measurement values.

Step 1405 executes process 14b on this shuffled data set to calculate corresponding change point data for this shuffled set. The change point calculated by step 1405 may also be referred to as reference change point.

Afterwards, decision step 1406 determines whether a sufficient amount of reference change points is available. In case additional reference change points are required, the process continues with step 1404. Step 1406 may use e.g. a minimum required number of reference change points, like 100 or 500 for this decision.

Steps 1404 to 1406 produce a set of reference change points from random permutations of the time series list. This reference change points may be used to determine whether the change point calculated in step 1402 is an artifact caused by natural, random fluctuations and should be rejected, or if it represents a significant change that cannot be explained by random effects.

Step 1407 performs this check, e.g. by determining the number of reference change points that indicate a change with an extend that is greater than the candidate change point calculated in step 1402. A certain percentage (e.g. 1%, 0.5%, 5%) of reference change points indicating a higher extend of change than the candidate change point may be used as an indication that the change point candidate is not relevant.

Following decision step 1408 may compare the percentage of reference change points indicating a higher extend of change than the candidate change point with a certain threshold, and continue with step 1410 which indicates a significant change point in case the percentage is below the threshold. Otherwise, step 1409 is executed which indicates no significant change point. After step 1409 or 14010 the process ends with step 1411.

FIG. 14b conceptually describes the processing of time series data to calculate a change point candidate (as e.g. performed in step 1402 and 1405 of the process described in FIG. 14a). The process starts with step 1420, when time series data for analysis is received. Following step 1421 sets a split position between the first data point and the second data point. The split position separates the two portions of the time series data between which a measurement describing their difference should be calculated. A max change value may also be set to a value indicating no difference between the two portions of the time series. Various statistic test directed to identify and quantify a difference between two separate populations (e.g. two portions of time series data) may be used to calculate a numeric value representing the difference between the two portions of the time series data. The max change value may be initiated to a value indicating no change according to the used statistic test. A typical value would be 0.

Following step 1422 executes a statistical test to determine and quantify the difference between the two portions of the time series. Examples for statistical tests that may be used by step 1442 include but are not limited to the Wilcoxon rank-sum test or the Cramer-von Mises test.

Afterwards, step 1423 normalizes the result value provided by the test execution on step 1422. Basically, process 14b creates all possible splits of the time series data, runs the statistical test to quantify the difference between the splits and then selects the split for which the test indicates the maximum difference. As a consequence, the tests are executed with different split sizes. E.g. for a time series with 10 entries, the tests would be executed with splitting (1,9) calculating the difference between the first data point and the 9 remaining data points, with splitting (2,8), (3,7) etc. until (9,1). This variance in the size of input sets has an influence on the test results which makes them non-comparable. Normalization eliminates this problem and makes the test results for different splits comparable.

Normalization may e.g. be performed by an initial preparation step determining the parameters of a distribution of result values for each splitting for data showing no change. The data describing these distributions may then be used to transform the results of the statistic tests into a normalized and comparable form.

Following decision step 1424 compares the currently stored max change value with the new, normalized change value. In case the new change value exceeds the max change value, following step 1425 sets the max change value to the new change value.

Afterwards, decision step 1426 is executed which checks whether a split position increment is possible. A split position increment is not possible if an increment would create a time series portion that contains no data points. In case an increment is possible, the process continues with step 1427 which increments the split position and then continues with step 1422.

If otherwise, no split position increment is possible, step 1428 is executed which indicates the identified max change point and the change time. The change time may be calculated as the average between the timestamps of the data point directly before the change point and directly after the change point. In case of shuffled data points (calls from step 1405 of process 14a), the change time is not used.

The process then ends with step 1429.

Coming now to FIG. 15 which visually describes the processing to identify a change point. FIG. 15a on the left shows a chart 1500 containing time series data sorted by time stamp that shows a change at a specific time. It also shows splits as vertical dashed lines (e.g. 1505) that are used to separate time series data portions for tests. The current split 1501 separates the time series data in a set of data points before 1502 and a set of data points after 1503 the split. A statistical measure M 1504 quantifying the difference between the separated portions of the time series data is calculated (e.g. Wilcoxon sum-rank or Cramer-von Mises) using the values before 1502 and after 153 the current split 1501 as input. The result of the calculation may, in this case, be 7.1 and may also be the maximum value for all splits of the sorted time series data.

FIG. 15b on the right side shows a shuffled version of the time series in which the measurement values are not sorted by their time stamp but randomly shuffled. As in FIG. 15a, there is a current split 1501 separating data points before 1502 and after 1503 the split, and also as in FIG. 15a, a statistical measure M is calculated using before and after data points as input. In this case, the result of the calculation may be 5.1, which is lower than the maximum value calculated for the sorted time series data, indicating that the change point candidate identified on the sorted data set is a significant change and not caused by random fluctuation.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

What is claimed is:

1. A computer-implemented method for monitoring performance in a distributed computing environment, comprising:
   a) receiving, by a causality estimator, a triggering event, where the triggering event indicates an abnormal operating condition in the distributed computing environment;
   b) retrieving, by the causality estimator, a causality rule for the triggering event from a repository, where the causality rule includes applicability criteria that must be met by a given event in order to apply the causality rule, and acceptance criteria that must be met for there to be a causal relationship between the given event and another event;
   c) identifying a topology entity upon which the triggering event was observed, and retrieving a candidate topology entity from a topology model, where the acceptance criteria in the retrieved causality rule specifies a relationship between the identified topology entity and a candidate topology entity, and the retrieved candidate topology entity matches the relationship specified by the acceptance criteria in the retrieved causality rule, wherein the topology model includes topology entities which collectively describe the distributed computing environment and defines relationships between the topology entities;
   d) evaluating observation data for the candidate topology entity in relation to the acceptance criteria in the retrieved causality rule; and
   e) in response to the observation data for the candidate topology entity matching the acceptance criteria in the retrieved causality rule, indicating the occurrence of an additional event on the candidate topology entity that is causally related to the triggering event.

2. The method of claim 1 further comprises monitoring, by a trigger event generator, measurement values of a time series and generating the triggering event when the measurement values exceed a threshold, where the triggering event includes an event type, a location identifier and a time at which the event occurred.

3. The method of claim 1 further comprises monitoring, by a trigger event generator, availability status data of a topology entity in a distributed computing environment and generating the triggering event upon detecting an abnormal operating condition for the topology entity when the availability status data indicates an unexpected availability state of the topology entity, where the triggering event includes an event type, a location identifier and a time at which the event occurred.

4. The method of claim 1 wherein the triggering event indicates an abnormality in response time for a given service and the retrieved candidate topology entity is a service called by the given service.

5. The method of claim 1 wherein the triggering event indicate an abnormality with load of a given service and the retrieved candidate topology entity is a service that calls the given service.

6. The method of claim 1 further comprises
   creating a node for the triggering event in a causality graph;
   creating a node for the additional event in the causality graph; and
   creating an edge between the node for the triggering event and the node for the additional event, thereby defining a causal relationship between the triggering event and the additional event.

7. The method of claim 1 further comprises repeating steps (b)-(e) for each additional event until a causality rule for the additional event is not retrieved from the repository and a candidate topology entity for the additional event is not retrieved from the topology model.

8. The method of claim 1 wherein the causality rule further specifies an observation time period from which data is considered to determine existence of an abnormal operating condition, data needed to evaluate the causality rule and an abnormality rule that specifies how to identify an abnormal operating condition, and the acceptance criteria includes a temporal focus time period, where the temporal focus time period defines a time period in which an abnormal operating condition is accepted as being causally related to the given event.

9. The method of claim 8 wherein evaluating observation data for the candidate topology entity in relation to the acceptance criteria in the retrieved causality rule further comprises
   retrieving observation data for the candidate topology entity which falls in the observation time period;

analyzing the retrieved observation data to determine presence of a significant change during the temporal focus time period of the given causality rule; and adding a causality event record to the causality graph in response to the presence of presence of a significant change during the temporal focus time period of the given causality rule.

10. The method of claim 1 wherein evaluating observation data for the candidate topology entity further comprises
1) quantifying a maximum change in the observation data and thereby yield a candidate change point, where the observation data is a time series and the maximum change is determined in accordance with a statistical method;
2) randomly shuffling data points in the observation data;
3) quantifying a maximum change in the shuffled data points in accordance with the statistical method, thereby yielding a reference change point;
4) repeating steps 2) and 3) to generate a plurality of reference change points;
5) determining a percentage of reference change points in the plurality of reference change points with a maximum change larger than the maximum change of the candidate change point; and
6) comparing the percentage to a threshold and determining presence of a significant change in response to the percentage exceeding the threshold.

11. The method of claim 10 wherein quantifying the maximum change in the observation data further comprises
a) setting a position along a time domain of the data;
b) splitting the data at the position into two subsets of data points;
c) quantifying a difference between the two subsets of data points;
d) incrementing the position along the time domain of the data; and
e) repeating steps b)-d) while maintaining a position along the time domain at which a maximum difference occurs and the quantified difference at the position.

12. The method of claim 10 wherein the statistical method is one of a Wilcoxon rank-sum test or a Cramer-von Mises test.

13. The method of claim 10 further comprises randomly shuffling data points using a Fisher-Yates method.

14. The method of claim 1 further comprises
retrieving, by a causality graph merger, a plurality of causality graphs;
for each causality event record in each causality graph, comparing a given causality event record in a given causality graph to each causality event record in remainder of the plurality of causality graphs; and
merging the given causality graph with another causality graph when the given causality event record is substantially similar to a causality event record in the another causality graph.

15. A computer-implemented system for monitoring performance in a distributed computing environment, comprising:
a rule repository that stores causality rules, where each causality rule includes applicability criteria that must be met by a given event in order to apply the causality rule, and acceptance criteria that must be met for there to be a causal relationship between the given event and another event;
a causality estimator is configured to receive a triggering event and, in response to receiving the triggering event, retrieves a causality rule for the triggering event from the rule repository, where the triggering event indicates an abnormal operating condition in the distributed computing environment;
wherein the causality estimator identifies a topology entity upon which the triggering event was observed, and retrieves a candidate topology entity from a topology model, where the acceptance criteria in the retrieved causality rule specifies a relationship between the identified topology entity and a candidate topology entity, and the retrieved candidate topology entity matches the relationship specified by the acceptance criteria in the retrieved causality rule, wherein the topology model includes topology entities which collectively describe the distributed computing environment and defines relationships between the topology entities;
for each candidate topology entity, the causality estimator evaluates observation data for the candidate topology entity in relation to the acceptance criteria in the retrieved causality rule; and in response to the observation data for the candidate topology entity matching the acceptance criteria in the retrieved causality rule, indicates the occurrence of an additional event on the candidate topology entity that is causally related to the triggering event, wherein the causality estimator is implemented by computer executable instructions executed by a computer processor.

16. The system of claim 15 further comprises a trigger event generator that monitors measurement values of a time series and generates the triggering event when the measurement values exceed a threshold, where the triggering event includes an event type, a location identifier and a time at which the event occurred.

17. The system of claim 16 wherein the trigger event generator monitors availability status data of a topology entity in a distributed computing environment and generates the triggering event upon detecting an abnormal operating condition for the topology entity when the availability status data indicates an unexpected availability state of the topology entity.

18. The system of claim 15 wherein the triggering event indicates an abnormality in response time for a given service and the retrieved candidate topology entity is a service called by the given service.

19. The system of claim 15 wherein the triggering event indicate an abnormality with load of a given service and the retrieved candidate topology entity is a service that calls the given service.

20. The system of claim 15 wherein the causality estimator creates a node for the triggering event in a causality graph; creates a node for the additional event in the causality graph; and creates an edge between the node for the triggering event and the node for the additional event, thereby defining a causal relationship between the triggering event and the additional event.

21. The system of claim 20 wherein the causality rule further specifies an observation time period from which data is considered to determine existence of an abnormal operating condition, data needed to evaluate the causality rule and an abnormality rule that specifies how to identify an abnormal operating condition, and the acceptance criteria includes a temporal focus time period, such that the temporal focus time period defines a time period in which an abnormal operating condition is accepted as being causally related to the given event;
wherein the causality estimator evaluates observation data for the candidate topology entity in relation to the acceptance criteria in the retrieved causality rule by retrieving observation data for the candidate topology entity which falls in the observation time period, analyzing the retrieved observation data to determine presence of a significant change during the temporal focus time period of the given causality rule, and adding a causality event record to the causality graph in response to the presence of presence of a significant change during the temporal focus time period of the given causality rule.

22. The system of claim 15 further comprises a causality graph merger that retrieves a plurality of causality graphs; for each causality event record in each causality graph, compares a given causality event record in a given causality graph to each causality event record in remainder of the plurality of causality graphs; and merges the given causality graph with another causality graph when the given causality event record is substantially similar to a causality event record in the another causality graph.

* * * * *